(12) United States Patent
Sumizawa

(10) Patent No.: US 10,697,790 B2
(45) Date of Patent: Jun. 30, 2020

(54) LANE SELECTING DEVICE, VEHICLE CONTROL SYSTEM AND LANE SELECTING METHOD

(71) Applicant: CLARION CO., LTD., Saitama (JP)

(72) Inventor: Akio Sumizawa, Saitama (JP)

(73) Assignee: CLARION CO., LTD., Saitama-Shi, Saitama (JP)

( * ) Notice: Subject to any disclaimer, the term of this patent is extended or adjusted under 35 U.S.C. 154(b) by 344 days.

(21) Appl. No.: 15/306,662

(22) PCT Filed: May 14, 2015

(86) PCT No.: PCT/JP2015/063912
§ 371 (c)(1),
(2) Date: Oct. 25, 2016

(87) PCT Pub. No.: WO2015/190212
PCT Pub. Date: Dec. 17, 2015

(65) Prior Publication Data
US 2017/0082452 A1    Mar. 23, 2017

(30) Foreign Application Priority Data
Jun. 10, 2014   (JP) .................................. 2014-119348

(51) Int. Cl.
*G01C 21/36*   (2006.01)
*G08G 1/16*    (2006.01)
(Continued)

(52) U.S. Cl.
CPC ......... *G01C 21/3658* (2013.01); *B60W 30/10* (2013.01); *G01C 21/3667* (2013.01);
(Continued)

(58) Field of Classification Search
None
See application file for complete search history.

(56) References Cited

U.S. PATENT DOCUMENTS

2001/0013837 A1   8/2001   Yamashita et al.
2003/0088344 A1   5/2003   Oda et al.
(Continued)

FOREIGN PATENT DOCUMENTS

EP    2659469 A1      11/2013
JP    2001-272240 A   10/2001
(Continued)

OTHER PUBLICATIONS

Extended European Search Report mailed by European Patent Office dated Jan. 5, 2018 in the corresponding European patent application No. 15806863.5-1803.
(Continued)

*Primary Examiner* — Ryan Rink
(74) *Attorney, Agent, or Firm* — IP Business Solutions, LLC

(57) ABSTRACT

To make it possible to execute processing taking into account the fact that a plurality of lanes are provided in a road. An automatic driving support device 500 includes a map database 541 including lane information concerning lanes of a road, a position specifying section 173 that specifies a present position of a vehicle, and a recommended-lane selecting section 171 that calculates, on the basis of the lane information, a recommendation degree of each of lanes of a road on which the vehicle is traveling and selects, on the basis of the calculated recommendation degree, a lane in which the vehicle travels. Therefore, it is possible to select a recommended lane taking into account the fact that a plurality of lanes are provided in a road.

4 Claims, 17 Drawing Sheets

(51) Int. Cl.
  *B60W 30/10* (2006.01)
  *G08G 1/00* (2006.01)
  *G08G 1/0968* (2006.01)
  *G08G 1/133* (2006.01)
  *G08G 1/01* (2006.01)
  *G08G 1/052* (2006.01)
  *G08G 1/0967* (2006.01)

(52) U.S. Cl.
  CPC .............. *G08G 1/00* (2013.01); *G08G 1/0112* (2013.01); *G08G 1/0129* (2013.01); *G08G 1/0133* (2013.01); *G08G 1/0141* (2013.01); *G08G 1/052* (2013.01); *G08G 1/096725* (2013.01); *G08G 1/096758* (2013.01); *G08G 1/096783* (2013.01); *G08G 1/096844* (2013.01); *G08G 1/133* (2013.01); *G08G 1/167* (2013.01)

(56) References Cited

U.S. PATENT DOCUMENTS

| | | | |
|---|---|---|---|
| 2007/0012407 | A1 | 5/2007 | Nakayama et al. |
| 2012/0245833 | A1 | 9/2012 | Zaitsu et al. |
| 2013/0103304 | A1* | 4/2013 | Nishibashi ......... G01C 21/3655 701/410 |
| 2013/0282264 | A1* | 10/2013 | Bastiaensen ....... G01C 21/3492 701/119 |
| 2014/0005923 | A1 | 1/2014 | Bank et al. |
| 2014/0207377 | A1* | 7/2014 | Gupta ................ G01C 21/3658 701/533 |
| 2014/0278052 | A1* | 9/2014 | Slavin ................ G01C 21/3492 701/400 |
| 2015/0175070 | A1* | 6/2015 | Attard ....................... B60R 1/00 340/439 |
| 2017/0018189 | A1* | 1/2017 | Ishikawa .............. G05D 1/0214 |
| 2017/0036679 | A1* | 2/2017 | Takeda .................. B60W 40/04 |
| 2017/0067752 | A1* | 3/2017 | Wagner .............. G01C 21/3632 |
| 2017/0370745 | A1* | 12/2017 | Woolley ............. G01C 21/3658 |
| 2018/0118223 | A1* | 5/2018 | Mori ...................... B60W 40/09 |
| 2018/0211533 | A1* | 7/2018 | Nakajima ................ G08G 1/00 |

FOREIGN PATENT DOCUMENTS

| | | |
|---|---|---|
| JP | 2003-141676 A | 5/2003 |
| JP | 2008-282263 A | 11/2008 |
| JP | 2009-47491 A | 3/2009 |
| JP | 2009-301132 A | 12/2009 |
| WO | 2011-074462 A1 | 6/2011 |
| WO | 2012/089281 A1 | 7/2012 |

OTHER PUBLICATIONS

The Japanese Office Action dated Aug. 22, 2017 in the corresponding Japanese patent application No. 2016-527702.
International Search Report issued for corresponding PCT/JP2015/063912 application.
Written Opinion of the International Search Authority issued for corresponding PCT/JP2015/063912 application.
International Preliminary Report on Patentability issued for corresponding PCT/JP2015/063912.
Written Opinion of the International Searching Authority issued for corresponding PCT/JP2015/063912.
Chinese Office Action dated Jan. 14, 2019 dated in the corresponding Chinese Patent Application No. 201580031057.0.
Chinese Office Action mailed by Chinese Patent Office dated Jul. 2, 2019 in corresponding Chinese patent application No. 201580031057.0.

* cited by examiner

FIG.8

LANE CHANGE COEFFICIENT TABLE TB

| REMAINING DISTANCE OF LANE CHANGEABLE SECTION | NUMBER OF TIMES OF LANE CHANGE | | |
|---|---|---|---|
| | 0 | 1 | 2 OR MORE |
| 0 OR MORE AND LESS THAN 0.2 km | 1 | 2 | 10 |
| 0.2 km OR MORE AND LESS THAN 0.5 km | 1 | 1.5 | 3.0 |
| 0.5 km OR MORE AND LESS THAN 1 km | 1 | 1.2 | 2.0 |
| 1 km OR MORE | 1 | 1 | 1 |

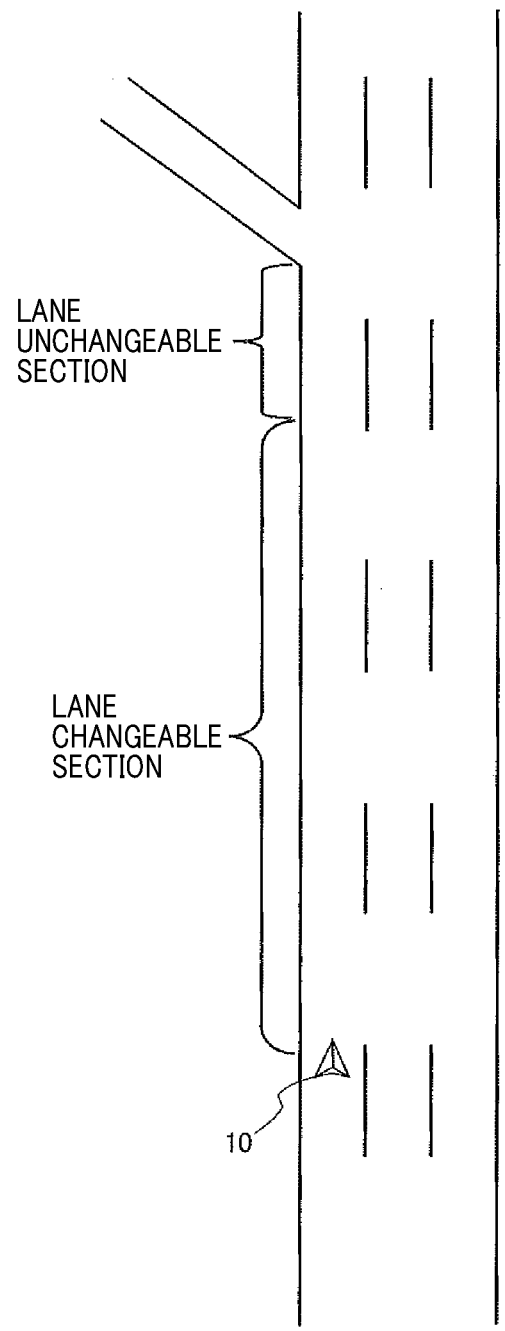

FIG.10A

| LANE ID | LINK LENGTH |
|---|---|
| LANE 1 | 10km |
| LANE 2 | 10km |

FIG.10B

| LANE ID | LINK LENGTH | PLANNED VEHICLE SPEED |
|---|---|---|
| LANE 1 | TRAVELING LANE | 60km/h |
| LANE 2 | TRAVELING LANE | 60km/h |

FIG.10C

| REMAINING DISTANCE OF LANE CHANGEABLE SECTION | NUMBER OF TIMES OF LANE CHANGE | |
|---|---|---|
| | 0 TIME | ONCE |
| 0 OR MORE AND LESS THAN 0.5 km | 1 | 2 |
| 0.5 km OR MORE | 1 | 1 |

FIG.10D

| LANE ID OF LANE IN WHICH VEHICLE SHOULD TRAVEL IMMEDIATELY BEFORE NEXT BRANCHING PORTION OR THE LIKE | LANE CHANGEABLE SECTION | RECOMMENDATION DEGREE | | |
|---|---|---|---|---|
| | | LANE 1 | LANE 2 | LANE 3 |
| LANE 2 | 6km | 1/360 | 1/360 | — |
| | 0.5km | 1/30 | 1/30 | — |
| | 0.3km | 1/36 | 1/18 | — |
| | 0.1km | 1/12 | 1/6 | — |

FIG.12

| LANE ID OF LANE IN WHICH VEHICLE SHOULD TRAVEL IMMEDIATELY BEFORE NEXT BRANCHING PORTION OR THE LIKE | LANE CHANGEABLE SECTION | RECOMMENDATION DEGREE | | |
|---|---|---|---|---|
| | | LANE 1 | LANE 2 | LANE 3 |
| LANE 1 | 25km | 1/1125 | 1/1000 | — |
| | 20km | 1/900 | 1/800 | — |
| | 10km | 1/450 | 1/400 | — |
| | 1km | 1/45 | 1/40 | — |
| | 0.9km | 1/40.5 | 1/43.2 | — |
| | 0.4km | 1/18 | 1/24 | — |
| | 0.1km | 1/4.5 | 1/8 | — |

FIG.16A
FIG.16B
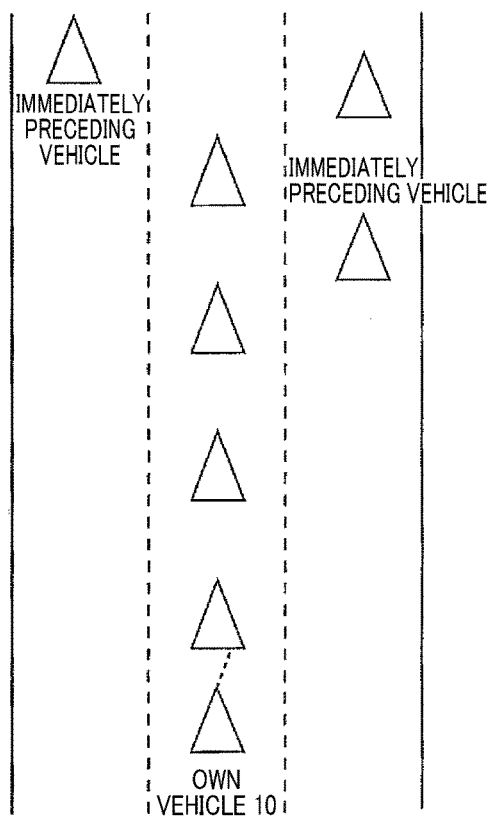
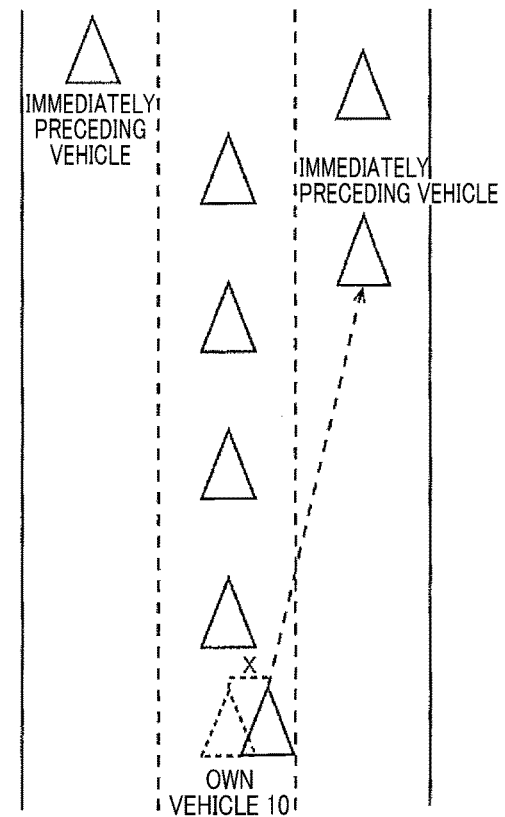

LANE SELECTING DEVICE, VEHICLE CONTROL SYSTEM AND LANE SELECTING METHOD

TECHNICAL FIELD

The present invention relates to a lane selecting device, a vehicle control system, and a lane selecting method.

BACKGROUND ART

Japanese Patent Application Laid-Open No. 2003-141676 (Patent Literature 1) describes that an automatic guide system 100 is configured from a navigation device 110 mounted on an own vehicle 101 and a management server device 130 fixed and set in an automatic traveling management center that manages an automatic traveling section. A communication line between the management server device 130 and the navigation device 110 is established by a mobile communication network 102. A route to a destination is searched by the navigation device 110. When at least a part of the automatic traveling section is used in the route, the automatic traveling section in which the own vehicle 101 travels is registered in the management server device 130 via the communication line."

PRIOR ART DOCUMENT

Patent Document

Patent Literature 1: Patent Application Laid-Open No. 2003-141676

SUMMARY OF INVENTION

Technical Problem

However, although a plurality of lanes are sometimes provided in a road, Patent Literature 1 does not take this point into account.

The present invention has been devised to achieve the object and an object of the present invention is to provide a lane selecting device, a vehicle control system, and a lane selecting method that execute processing taking into account the fact that a plurality of lanes are provided in a road.

Solution to Problem

This specification includes the entire content of Japanese Patent Application No. 2014-119348 filed on Jun. 10, 2014.

In order to achieve the object, a lane selecting device includes: a storing section that stores a map database including lane information, which is information concerning lanes of a road; a present-position specifying section that specifies a present position of a vehicle; and a recommended-lane selecting section that calculates, on the basis of the present position specified by the present-position specifying section and the lane information included in the map database, for each of lanes of a road on which the vehicle is traveling, a recommendation degree indicating a degree of recommending traveling and selects, on the basis of the calculated recommendation degree, a lane in which the vehicle travels.

Advantageous Effects of Invention

According to the present invention, it is possible to provide a lane selecting device and a lane selecting method that execute processing taking into account the fact that a plurality of lanes are provided in a road.

BRIEF DESCRIPTION OF DRAWINGS

FIG. 8 is a diagram showing an example of a lane change coefficient table TB.

FIG. 9 is a diagram showing a lane changeable section and a lane unchangeable section.

FIG. 10A is a diagram showing link length of each of lanes of a road including a plurality of lanes, FIG. 10B is a diagram showing planned vehicle speed in each of the lanes, FIG. 10C is a diagram showing a part of the lane change coefficient table TB, and FIG. 10D is a diagram showing a recommendation degree of each of the lanes calculated according to the remaining distance of the lane changeable section.

FIG. 11 is a diagram showing a lane unchangeable section in the case in which a traffic jam occurs in the next branching portion or the like.

FIG. 12 is a diagram showing recommendation degrees corresponding to the remaining distances of lane changeable sections of a lane having a lane ID "1" and a lane having a lane ID "2".

FIG. 16A shows a case in which an inter-vehicle distance to an immediately preceding vehicle traveling in the right side lane cannot be measured by a radar device and FIG. 16B shows a case in which an own vehicle is moved to the right side by a distance X in an own lane.

DESCRIPTION OF EMBODIMENTS

Figure 1:
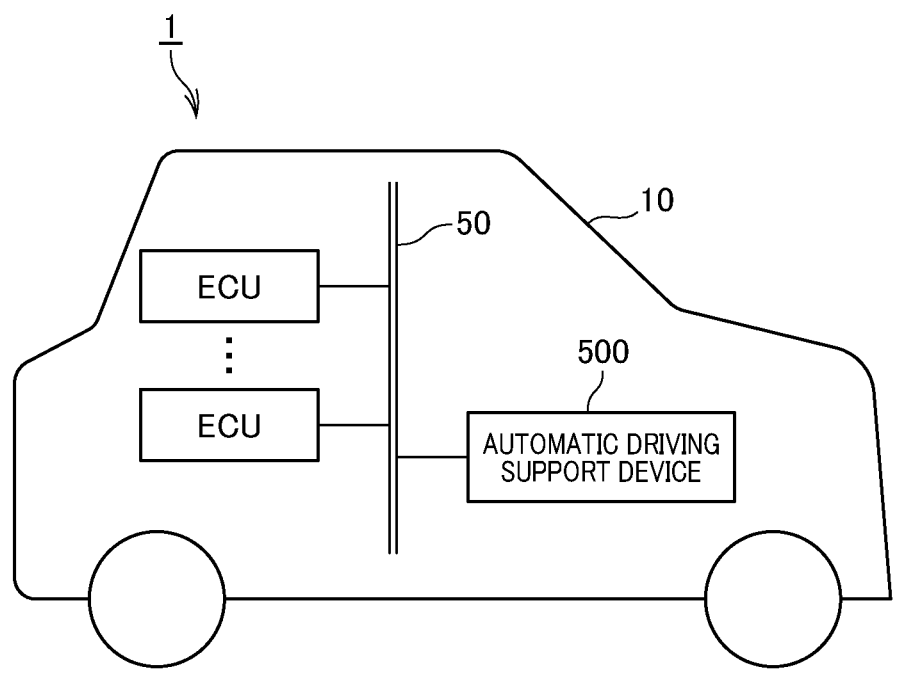
FIG. 1 is a diagram showing an automatic driving support system.

FIG. 1 is a diagram showing an automatic driving support system 1 according to an embodiment.

The automatic driving support system 1 is a system that enables automatic traveling of an own vehicle 10 mounted with the system without a driver manually performing operation concerning driving. In the following explanation, the own vehicle 10 automatically traveling with the function of the automatic driving support system 1 is referred to as "automatic driving".

As shown in FIG. 1, the automatic driving support system 1 includes an automatic driving support device 500 and a plurality of EECUs (Engine Control Units). The automatic driving support device 500 and the EECUs are connected to each other via a CAN (Controller Area Network) bus 50. In this embodiment, a case in which the CAN bus 50 is used as a communication bus is explained as an example. However, as a vehicle-mounted communication bus, other communication buses such as a LIN (Local Interconnect Network), a Flex ray, IEEE1394, and a vehicle-mounted Ethernet (registered trademark) can also be used.

Figure 2:
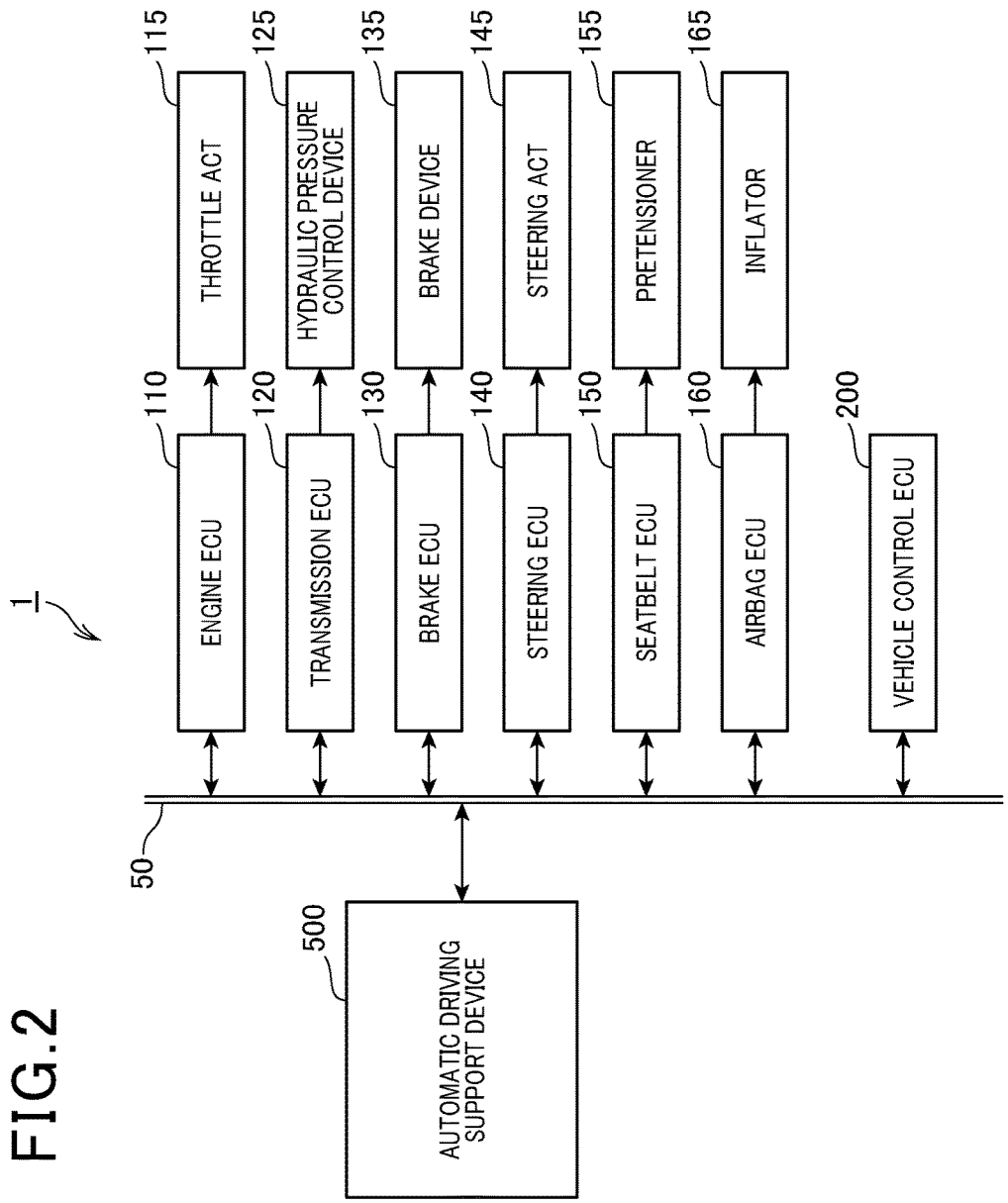
FIG. 2 is a block diagram of the automatic driving support system.

FIG. 2 is a block diagram of the automatic driving support system 1.

As shown in FIG. 2, the automatic driving support system 1 includes an engine ECU 110, a transmission ECU 120, a brake ECU 130, a steering ECU 140, and a seatbelt ECU 150. The automatic driving support system 1 includes an airbag ECU 160, a vehicle control ECU 200, and an automatic driving support device 500 (a lane selecting device).

The engine ECU 110 is connected to a throttle actuator (hereinafter, actuator is abbreviated as ACT) 115. An electronic throttle valve is provided in an intake pipe of an engine. The electronic throttle valve can be opened and closed by the throttle ACT 115. The engine ECU 110 controls the throttle ACT 115 on the basis of a control signal received from the vehicle control ECU 200 and drives the electronic throttle valve. Consequently, an opening degree of the electronic throttle valve is adjusted to set engine speed to target speed.

The transmission ECU 120 is connected to a hydraulic pressure control device 125. The transmission ECU 120 controls the hydraulic pressure control device 125 on the basis of a control signal received from the vehicle control ECU 200 and adjusts hydraulic pressure of hydraulic fluid supplied to a transmission. Consequently, a change gear ratio of the transmission is controlled. The transmission is coupled to an output shaft of the engine. The transmission switches the change gear ratio according to a traveling situation of the own vehicle 10 and changes the number of revolutions and torque transmitted from the engine.

The brake ECU 130 is an ECU that performs control of brake devices 135. The brake ECU 130 controls, on the basis of a control signal received from the vehicle control ECU 200, the brake devices 135 provided in wheels of the own vehicle 10 and performs braking of the own vehicle 10.

The steering ECU 140 is connected to a steering ACT 145 that applies an assist force to steering. The steering ECU 140 controls, on the basis of a control signal received from the vehicle control ECU 200, the steering ACT 145 to output assist torque necessary for steering of the own vehicle 10.

The seatbelt ECU 150 is connected to a pretensioner 155. When it is predicted that there is a risk of the own vehicle 10 colliding against an obstacle, the seatbelt ECU 150 actuates the pretensioner 155 to remove slack of a seatbelt and surely fix an occupant to a seat. Consequently, it is possible to improve safety of the occupant in the case of collision.

The airbag ECU 160 is connected to an inflator 165 functioning as a gas generating device. When collision of the own vehicle 10 is detected by a control section 170, the airbag ECU 160 actuates the inflator 165 to expand an airbag.

During the automatic driving, the vehicle control ECU 200 receives automatic driving control information from the automatic driving support device 500. The automatic driving control information is control information concerning the automatic traveling of the own vehicle 10 such as control information of start/stop of the own vehicle 10, control information of acceleration and deceleration of the own vehicle 10, and control information of steering of the own vehicle 10. The vehicle control ECU 200 generates, on the basis of the automatic driving control information, control signals for controlling the engine ECU 110, the transmission ECU 120, the brake ECU 130, and the steering ECU 140. The vehicle control ECU 200 transmits the generated control signals to the ECUs and controls the ECUs.

Figure 3:
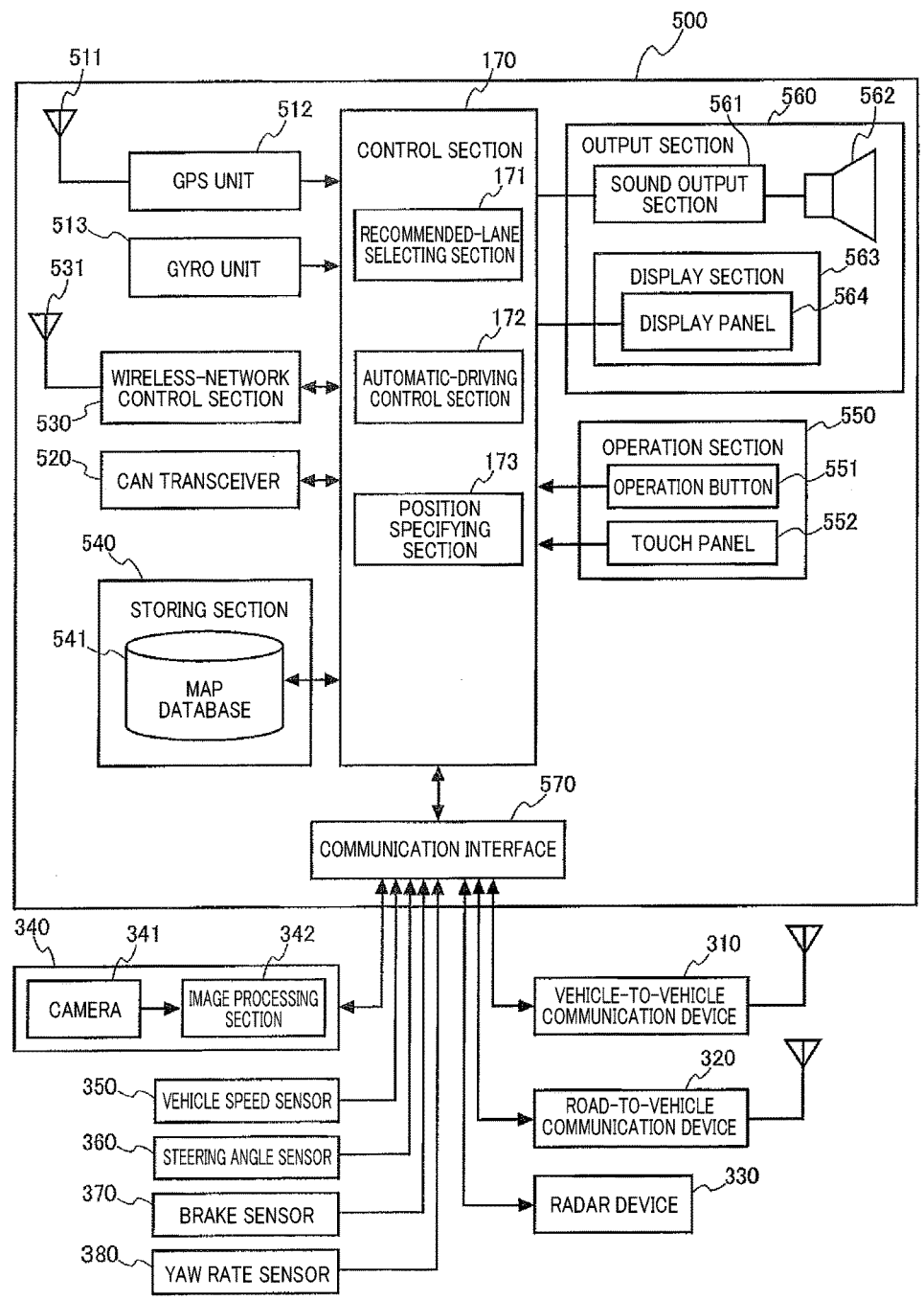
FIG. 3 is a block diagram showing a functional configuration of an automatic driving support device.

FIG. 3 is a block diagram showing a functional configuration of the automatic driving support device 500.

The automatic driving support device 500 is a device that, during the automatic driving of the own vehicle 10, generates the automatic driving control information and outputs the automatic driving control information to the vehicle control ECU 200 to thereby enable the automatic driving.

As shown in FIG. 3, the automatic driving support device 500 includes the control section 170, a GPS unit 512, a gyro unit 513, a CAN transceiver 520, and a wireless-network control section 530. The automatic driving support device 500 includes a storing section 540, an operation section 550, an output section 560, and a communication interface 570.

The control section 170 includes a CPU, a ROM, a RAM, and other peripheral circuits and controls the sections of the automatic driving support device 500. The control section 170 includes, as functional blocks, a recommended-lane selecting section 171, an automatic-driving control section 172, and a position specifying section 173. Functions of the functional blocks are realized by cooperation of hardware and software, for example, realized by a CPU included in the control section 170 reading out and executing a program. Processing executed by the functional blocks is explained in detail below.

The GPS unit 512 receives a GPS radio wave from a GPS satellite via a GPS antenna 511 and calculates, from a GPS signal superimposed on the GPS radio wave, with an arithmetic operation, a position coordinate indicating the present position of the own vehicle 10 and an advancing direction of the own vehicle 10. The GPS unit 512 outputs information indicating the calculated position coordinate and the calculated advancing direction to the control section 170.

The gyro unit 513 includes a gyro sensor (not shown in the figure) and outputs relative orientation information of the own vehicle 10 detected by the gyro sensor to the control section 170.

The CAN transceiver 520 is connected to a CAN bus 50. The CAN transceiver 520 is an IC (integrated Circuit) for interface between the automatic driving support device 500 and the CAN bus 50. The CAN transceiver 520 transmits data generated by the control section 170 to the other ECUs via the CAN bus 50 and receives, via the CAN bus 50, data transmitted from the other ECUs and outputs the data to the control section 170.

The wireless-network control section 530 includes a radio antenna 531. The wireless-network control section 530 is connected to a communication network via the radio antenna 531 and transmits and receives data with other devices such as an external server connected via the communication network. Various kinds of information acquired by the automatic driving support device 500 from the other devices such as the external server include, for example, telematics information.

The storing section 540 includes a nonvolatile memory and stores various data. In the storing section 540, besides a control program for route guide, a map database 541 that stores various data such as map data and display image data served for the route guide is stored. In the storing section 540, a lane change coefficient table TB is stored. The map database 541 and the lane change coefficient table TB are explained below.

Note that, as the storing section 540, portable storage media such as a hard disk device, a computer-readable flexible disk (FD), a DVD (Digital Versatile Disc), and a DVD-RAM can be used. As the storing section 540, portable storage media such as a CD-ROM (Compact Disc Read Only Memory), a CD-R (Recordable)/RW (Rewritable), a magneto-optical disk, an IC card, and an SD card may be used.

The operation section 550 includes, in addition to an operation button 551, a touch panel 552 disposed over a display panel 564. When a user touches various button indicators displayed on the display panel 564 with a finger or the like, the operation section 550 outputs a signal indicating a touched place of the touch panel 552 to the control section 170.

The output section 560 includes a sound output section 561, a speaker 562, and a display section 563. The sound output section 561 includes a D/A converter and an amplifier not shown in the figure. The sound output section 561 digital/analog-converts a sound data signal for route guide, amplifies the sound data signal with the amplifier, and outputs the sound data signal into a vehicle interior of the own vehicle 10 as sound with the speaker 562. The display section 563 includes the display panel 564 and displays an image on the display panel 564 according to control by the control section 170. As the display panel 564, for example, a liquid crystal display panel and an EL (Electro Luminescent) display panel can be used.

The communication interface 570 communicates, according to the control by the control section 170, an external apparatus and an external sensor according to a predetermined communication standard. As shown in FIG. 3, a vehicle-to-vehicle communication device 310, a road-to-vehicle communication device 320, a radar device (a measuring section and a periphery monitoring section) 330, and a camera device (a measuring section and a periphery monitoring section) 340 are connected to the communication interface 570. A vehicle speed sensor 350, a steering angle sensor 360, a brake sensor 370, and a yaw rate sensor 380 are connected to the communication interface 570.

The vehicle-to-vehicle communication device 310 performs vehicle-to-vehicle communication for transmitting vehicle information to each other between the own vehicle 10 and a peripheral vehicle located around the own vehicle 10 through wireless communication. The vehicle information includes information such as identification information for identifying the own vehicle 10 and the peripheral vehicle, position information of the own vehicle 10 and the peripheral vehicle, vehicle speeds of the own vehicle 10 and the peripheral vehicle, and advancing directions of the own vehicle 10 and the peripheral vehicle. The vehicle-to-vehicle communication device 310 outputs the vehicle information of the peripheral vehicle received by the vehicle-to-vehicle communication to the automatic driving support device 500.

The road-to-vehicle communication device 320 is a receiver that receives, from a roadside machine (not shown in the figure) set on a roadside such as a crossing, traffic information transmitted by a radio wave beacon, an optical beacon, or narrow-band wireless communication such as DSRC (Dedicated Short Range Communications). The traffic information transmitted from the roadside machine to the road-to-vehicle communication device 320 includes, for example, traffic jam information, information concerning traffic lights, and information concerning pedestrians. The road-to-vehicle communication device 320 outputs the traffic information received from the roadside machine to the automatic driving support device 500.

The radar device 330 irradiates a radio wave such as a millimeter radar or a laser radar or a sound wave such as an ultrasound radar on a predetermined range ahead of the own vehicle 10. The radar device 330 receives reflected light reflected by a target object (e.g., a preceding vehicle) present within the predetermined range to detect information concerning the preceding vehicle traveling ahead of the own vehicle 10 (hereinafter referred to as preceding vehicle information). The detected preceding vehicle information includes information such as presence or absence information of a preceding vehicle, a distance (an inter-vehicle distance) to the preceding vehicle, an angle (a relative position), speed (relative speed), and acceleration. The radar device 330 outputs the detected preceding vehicle information to the automatic driving support device 500.

The radar device 330 may be mounted on the own vehicle 10 to be capable of irradiating a radio wave to a predetermined range behind the own vehicle 10.

The camera device 340 includes a camera 341 and an image processing section 342. The camera 341 is disposed, for example, in a position for looking out over the outside of the vehicle from an upper part of a windshield in a vehicle interior. The camera 341 picks up an image of a situation outside the vehicle through the windshield. As the camera 341, a rear camera that photograph the rear of the own vehicle 10, a left camera that photographs the left side of the own vehicle 10, a right camera that photographs the right side of the own vehicle 10, and the like can be provided. For example, the rear camera can be attached to the rear end of the own vehicle 10 in a posture in which an image pickup surface is directed to the rear direction of the own vehicle 10. The left camera can be attached to the vicinity of a left side view mirror in a posture in which an image pickup surface is directed to the left direction of the own vehicle 10. The right camera can be attached to the vicinity of a right side view mirror in a posture in which an image pickup surface is directed to the right direction of the own vehicle 10. Further, the camera 341 may include a stereo camera device that can acquire images obtained by photographing the same target object (vehicle) from different two visual points.

The camera device 340 processes image data photographed by the camera 341 into an image with the image processing section 342 and outputs the image to the automatic driving support device 500.

The vehicle speed sensor 350 detects vehicle speed of the own vehicle 10 and outputs a detection signal representing the detected vehicle speed to the automatic driving support device 500.

The steering angle sensor 360 detects a steering angle of steering and outputs a detection signal representing the detected steering angle to the automatic driving support device 500.

The brake sensor 370 detects an operation amount (a step-in amount, an angle, pressure, etc.) of the driver on a brake pedal and outputs a detection signal representing the detected operation amount to the automatic driving support device 500.

The yaw rate sensor 380 detects a yaw rate related to the own vehicle 10 and outputs a detection signal representing the detected yaw rate to the automatic driving support device 500.

The automatic-driving control section 172 and the position specifying section 173 included in the control section 170 of the automatic driving support device 500 are explained.

First, the position specifying section 173 is explained. The position specifying section 173 specifies the present position of the own vehicle 10 on the basis of input information. The input information includes, for example, the information indicating the position coordinate and the advancing direction input from the GPS unit 512, the relative orientation information of the own vehicle 10 input from the gyro unit 513, and the information included in the map data stored in the map database 541 of the storing section 540. The input information includes the detection signal indicating the vehicle speed input from the vehicle speed sensor 350 and the detection signal representing the steering angle input from the steering angle sensor 360. Further, the input information includes the detection signal representing the operation amount of the brake input from the brake sensor 370 and the detection signal representing the yaw rate input from the yaw rate sensor 380.

The position specifying section 173 estimates moving speed, a moving direction, and the like of the own vehicle 10 at any time, for example, on the basis of information input from the various sensors such as the gyro unit 513 and information included in the map data. The position specifying section 173 corrects, on the basis of the estimated moving speed, the estimated moving direction, and the like, the present position of the own vehicle 10 calculated on the basis of the input from the GPS unit 512. Note that the position specifying section 173 may be configured to specify the present position of the own vehicle 10 using a signal of a positioning satellite system such as GLONASS, Galileo, Beidou, or QZSS (michibiki) together with a GPS signal.

The automatic-driving control section 172 is explained. During the automatic driving, the automatic-driving control section 172 generates automatic driving control information and outputs the automatic driving control information to the vehicle control ECU 200. As explained above, the automatic driving control information is the control information concerning automatic traveling of the own vehicle 10 such as the control information of start/stop of the own vehicle 10, the control information of acceleration and deceleration of the own vehicle 10, and the control information of steering of the own vehicle 10. The vehicle control ECU 200 controls the ECUs such as the engine ECU 110 on the basis of the automatic driving control information, whereby the automatic driving is realized.

A basic operation of the automatic-driving control section 172 is explained below. The automatic-driving control section 172 controls the display section 563 to display a user interface, to which a destination can be input, on a display panel 564. The user inputs a destination using the user interface. When the destination is input to the user interface, the automatic-driving control section 172 searches for a route leading to the destination from the present position of the own vehicle 10 specified by the position specifying section 173. The search for the route leading to the destination is performed using an existing technique in which link cost is used. Note that, in the map database 541, link costs of links are set from the viewpoint of whether the link costs are suitable for the automatic driving. A route suitable for the automatic driving is searched by the automatic-driving control section 172.

After searching for the route leading to the destination, the automatic-driving control section 172 generates a target traveling pattern and a target speed pattern at the time when the own vehicle 10 travels on the searched route. Subsequently, the automatic-driving control section 172 generates automatic driving control information for controlling driving such that the own vehicle 10 travels according to the generated target traveling pattern and the generated target speed pattern. That is, the automatic-driving control section 172 generates automatic driving control information including control information for starting/stopping and steering the own vehicle 10 to travel along the target traveling pattern and accelerating and decelerating the own vehicle 10 to travel at speed conforming to the target speed pattern.

During the automatic driving, the automatic-driving control section 172 adjusts the target traveling pattern and the target speed pattern on the basis of the vehicle information input from the vehicle-to-vehicle communication device 310 according to a relation between the own vehicle 10 and a vehicle located around the own vehicle 10. The automatic-driving control section 172 acquires presence or absence of a traffic jam, states of traffic lights, presence or absence of pedestrians, and the like on the basis of the traffic information input from the road-to-vehicle communication device 320 and adjusts the target traveling pattern and the target speed pattern. The automatic-driving control section 172 adjusts the target traveling pattern and the target speed pattern on the basis of the preceding vehicle information input from the radar device 330 according to a relation between the own vehicle 10 and the preceding vehicle. The automatic-driving control section 172 acquires information concerning an environment of the own vehicle 10 on the basis of the image data input from the camera device 340 and adjusts the target traveling pattern and the target speed pattern to correspond to the environment of the own vehicle 10. The automatic-driving control section 172 generates automatic driving control information on the basis of the target traveling pattern and the target speed pattern after the adjustment.

The automatic-driving control section 172 outputs the generated automatic driving control information to the vehicle control ECU 200. The vehicle control ECU 200 controls the ECUs such as the engine ECU 110 on the basis of the automatic driving control information. As a result, the own vehicle 10 automatically travels according to the target traveling pattern and the target speed pattern adjusted as appropriate. The automatic driving to the destination is realized.

During the automatic driving, the automatic-driving control section 172 displays a map around the own vehicle 10 on the display panel 564 on the basis of the map database 541 and displays, on the basis of an input from the position specifying section 173, a mark indicating the present position of the own vehicle 10 on the map. The automatic-driving control section 172 clearly indicates a route leading to the destination on the map.

Incidentally, during the automatic driving, the own vehicle 10 sometimes travels on a road on which a plurality of lanes are provided. Time until the own vehicle 10 reaches the destination changes according to in which lane of the plurality of lanes the own vehicle 10 travels. Therefore, selection of a lane in which the own vehicle 10 travels is important. Taking the above into account, when the own vehicle 10 travels on the road on which the plurality of lanes are provided, the automatic driving support device 500 according to this embodiment selects a lane suitable for the traveling reflecting a characteristic of the automatic driving that a vehicle automatically travels.

The operation of the automatic driving support device 500 concerning the selection of a lane is explained in detail below.

Figure 4:
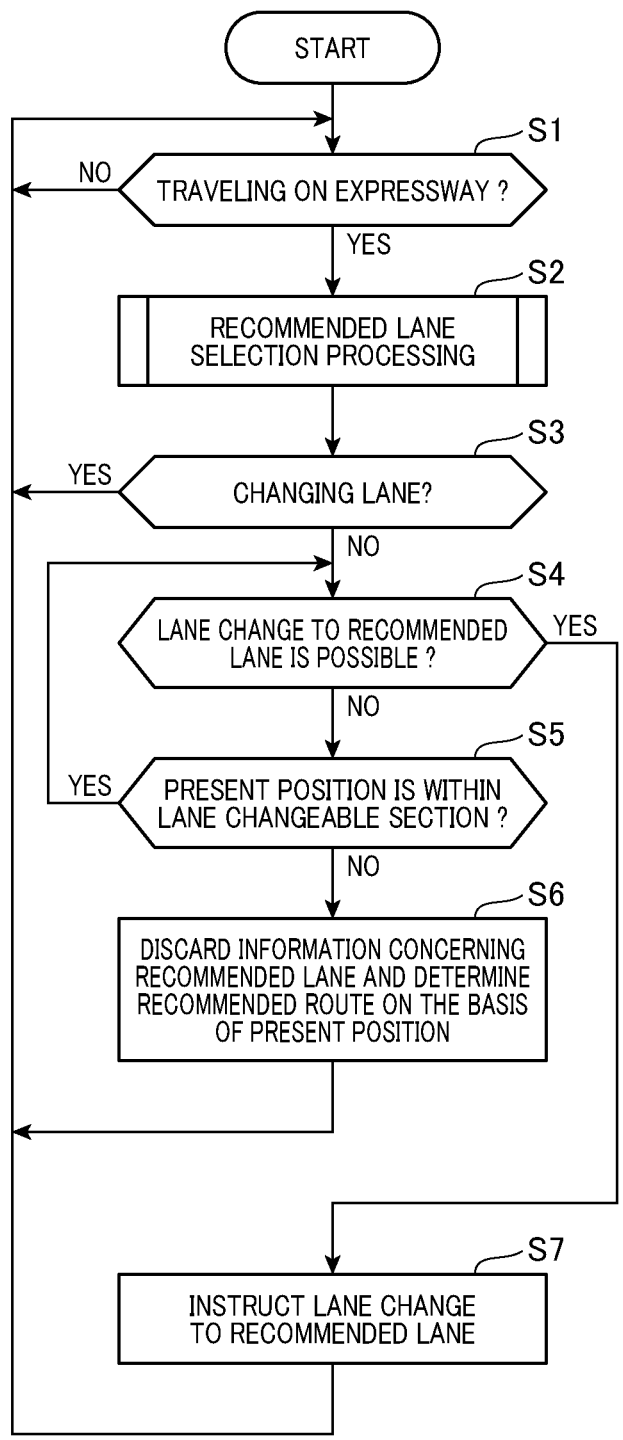
FIG. 4 is a flowchart showing an operation procedure of the automatic driving support device.
Figure 5:
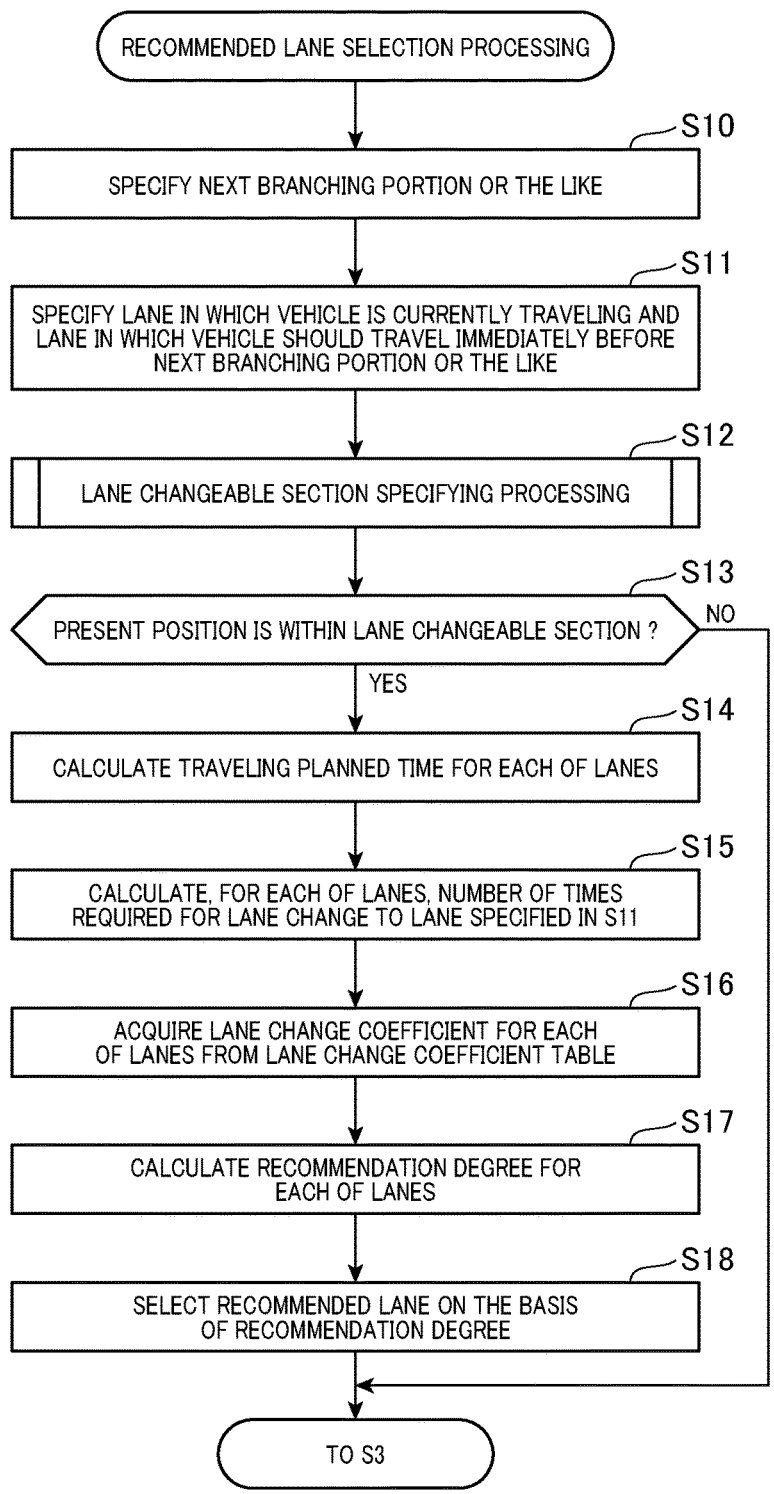
FIG. 5 is a flowchart showing the operation procedure of the automatic driving support device.
Figure 6:
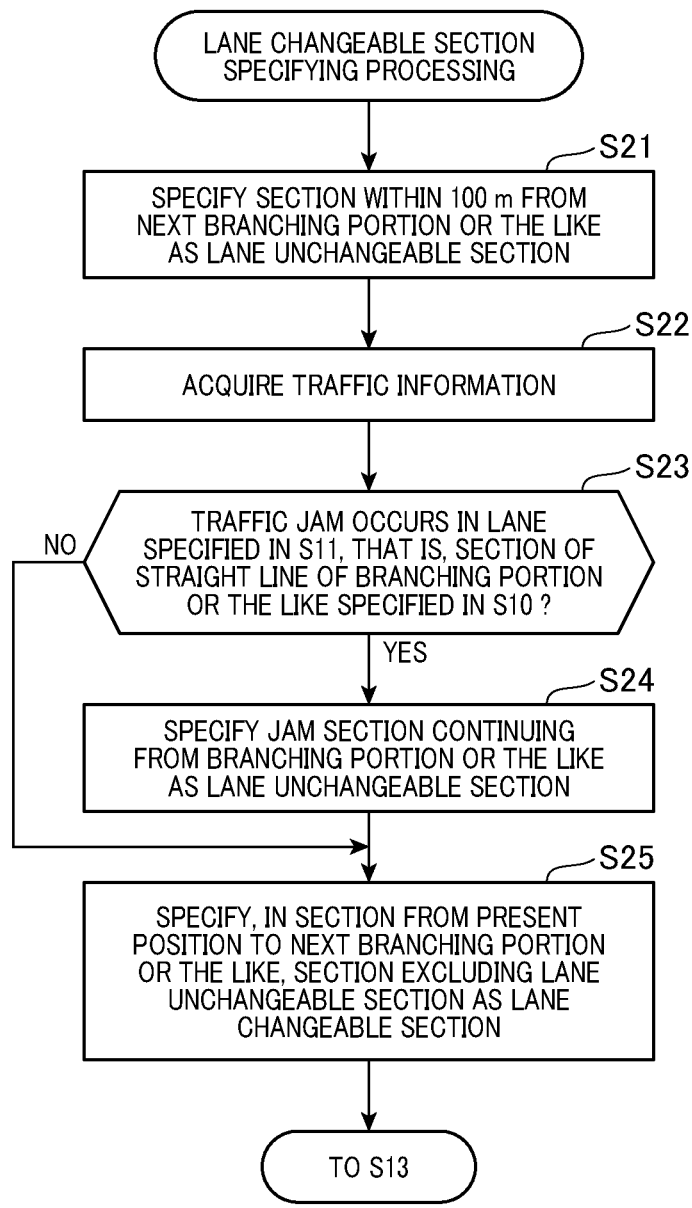
FIG. 6 is a flowchart showing the operation procedure of the automatic driving support device.

FIGS. 4, 5, and 6 are flowcharts showing the operation of the automatic driving support device 500.

In the following explanation, concerning an overtaking lane among a plurality of lanes of a road, since the overtaking lane is a lane in which traveling is permitted to overtake a forward vehicle, a recommendation degree is not calculated such that the overtaking lane is not selected as a traveling lane. However, in the selection of the traveling lane, the overtaking lane may be selected. For example, when the overtaking lane is selected as a recommended lane, a vehicle may be set to return to the traveling lane within a predetermined time after a lane is changed to the overtaking lane.

The automatic driving support device 500 has a first mode and a second mode as operation modes. The first mode is a mode for performing, only during traveling on an expressway, calculation of a recommendation degree for each of lanes explained below and selection of a traveling lane based on the calculated recommendation degree. The second mode is a mode for performing the processing during traveling on the expressway and the roads other than the expressway. As explained below, when a lane selected on the basis of the calculated recommendation degree is different from a lane in which the own vehicle 10 is currently traveling, a lane in which the own vehicle 10 travels is changed. During traveling on a general road, since stops by traffic lights and right and left turns in crossings are performed, a distance in which the own vehicle 10 continuously travels straight is short. The user sometimes does not desire to frequently change a lane while traveling on the general road. Taking this into account, the automatic driving support device 500 has the first mode and the second mode as the operation modes and, when the first mode is selected, the automatic driving support device 500 selects the traveling lane only during traveling on the expressway. In the following explanation, it is assumed that the first mode is selected as the operation mode.

As shown in FIG. 4, the recommended-lane selecting section 171 of the control section 170 discriminates whether the own vehicle 10 is traveling on an expressway (step S1). For example, the recommended-lane selecting section 171 discriminates on the basis of the present position of the own vehicle 10 specified by the position specifying section 173 and the information of the map database 541 whether the present position of the own vehicle 10 is matched with a link corresponding to the expressway. When the own vehicle 10 is not traveling on the expressway (NO in step S1), the recommended-lane selecting section 171 returns the processing procedure to step S1 and continuously discriminates whether the own vehicle 10 is traveling on the expressway.

When the own vehicle 10 is traveling on the expressway (YES in step S1), the recommended-lane selecting section 171 executes recommended lane selection processing (step S2). The recommended lane selection processing is processing for calculating a recommendation degree, which indicates a degree of recommending traveling, for each of lanes of a road on which the own vehicle 10 is traveling and selecting a traveling lane on the basis of the calculated recommendation degree. The recommended lane selection processing is explained in detail below with reference to the flowchart of FIG. 5. A lane selected by the recommended lane selection processing is hereinafter referred to as "recommended lane".

After selecting a recommended lane according to the recommended lane selection processing in step S2, the recommended-lane selecting section 171 determines whether the own vehicle 10 is changing a lane (step S3). When the own vehicle 10 is changing a lane (YES in step S3), the recommended-lane selecting section 171 returns the processing procedure to step S1. That is, the recommended-lane selecting section 171 does not execute processing in step S5 and subsequent steps and does not execute a lane change to the recommended lane. This is because of a reason explained below. When the own vehicle 10 is changing a lane to the recommended lane, the processing in step S5 and subsequent steps for the purpose of the lane change to the recommended lane does not need to be performed. While the own vehicle 10 is changing a lane to a lane other than the recommended lane, a sudden turn of the own vehicle 10 is prevented from occurring. In step S3, for example, the recommended-lane selecting section 171 discriminates on the basis of the target traveling pattern adjusted by the automatic-driving control section 172 and the map database 541 whether the own vehicle 10 is changing a lane.

When determining that the own vehicle 10 is not currently changing a lane (NO in step S3), the recommended-lane selecting section 171 determines whether the lane change to the recommended lane is possible (step S4). The recommended-lane selecting section 171 determines, for example, on the basis of image data input by the camera device 340, vehicle speed of another vehicle traveling in the recommended lane and an inter-vehicle distance between the own vehicle 10 and the other vehicle traveling in the recommended lane. The recommended-lane selecting section 171 acquires, on the basis of inputs from the vehicle-to-vehicle communication device 310, the road-to-vehicle communication device 320, the radar device 330, and the like, information used for determining whether the lane change to the recommended lane is possible. The recommended-lane selecting section 171 determines on the basis of the acquired information whether the lane change is possible.

When the lane change to the recommended lane is possible (YES in step S4), the recommended-lane selecting section 171 instructs the automatic-driving control section 172 to change a lane to the recommended lane (step S7) and returns the processing procedure to step S1. The automatic-driving control section 172, which receives the instruction for the lane change, adjusts the target traveling pattern and the target speed pattern reflecting the lane change to the recommended lane on the patterns, generates automatic driving control information on the basis of the adjusted patterns, and outputs the automatic driving control information to the vehicle control ECU 200.

On the other hand, when the change to the recommended lane is impossible (NO in step S4), the recommended-lane selecting section 171 discriminates whether the own vehicle 10 is located in a lane changeable section (step S5). The lane changeable section is a section specified by lane changeable section specifying processing (step S12 in FIG. 5) explained below and is a section set as a section in which a lane can be changed.

When the own vehicle 10 is located in the lane changeable section (YES in step S5), the recommended-lane selecting section 171 returns the processing procedure to step S4.

When the own vehicle 10 is not located in the lane changeable section (NO in step S5), the recommended-lane selecting section 171 shifts the processing procedure to step S6. In other words, when time elapses while a state in which the lane change to the recommended lane cannot be performed continues and the own vehicle 10 enters a lane unchangeable section, the recommended-lane selecting section 171 shifts the processing procedure to step S6. In step S6, the recommended-lane selecting section 171 discards information concerning the recommended lane, determines, as a route to a destination (a recommended route), a route starting from the present position where a lane is not changed (step S6), notifies the automatic-driving control section 172 of the route, and returns the processing procedure to step S1. The automatic-driving control section 172 adjusts the target traveling pattern and the target speed pattern on the basis of the notified route, generates automatic driving control information at any time on the basis of the patterns, and outputs the automatic driving control information to the vehicle control ECU 200.

Note that, in the flowchart shown in FIG. 4, the automatic driving support device 500 is set to repeat the processing from step S1 immediately after notifying the automatic-driving control section 172 of the lane change to the recommended lane. However, when a navigation ECU 170 performs selection processing for the next recommended lane immediately after instructing a driving support ECU 300 to change a lane, it is highly likely that the same lane is selected as the recommended lane. The navigation ECU 170 is caused to perform a useless arithmetic operation. Therefore, after instructing the driving support ECU 300 to change a lane, the navigation ECU 170 may stay on standby for a predetermined time and then select the next recommended lane.

The map database 541 used in the processing and the lane change coefficient table TB are explained before the recommended lane selection processing is explained with reference to FIG. 5.

Figure 7:
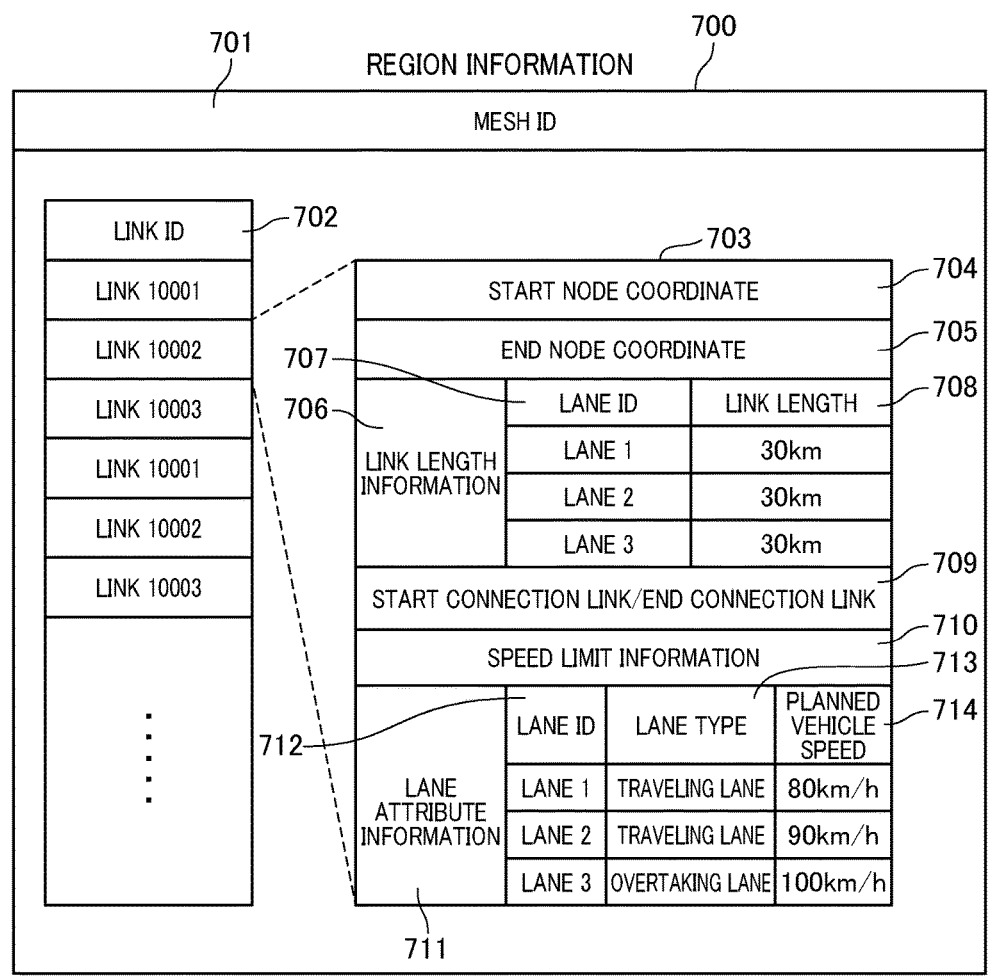
FIG. 7 is a diagram showing an example of region information stored in a map database.

FIG. 7 is a diagram showing region information 700 included in the map database 541. FIG. 8 is a diagram showing the lane change coefficient table TB. The region information 700 includes information concerning lanes (lane information).

In the region information 700, for each of mesh IDs 701 for identifying regions on a map, link IDs 702 of roads included in meshes and link information 703 are registered in association with each other. In the link information 703, point coordinates 704 and 705 of a start node and an end node indicating both ends of a road and link length information 706 indicating the length of the road are stored. In the link information 703, start connection link/end connection link information 709, in which link IDs of other roads respectively connected to the start node and the end node of the road are stored, is stored. Further, in the link information 703, speed limit information 710 indicating a speed limit of the road and lane attribute information 711 indicating attributes of lanes of the road are stored.

Note that a node means a coordinate position for specifying a crossing or a bending point of a road. When roads on a map are divided at a plurality of nodes such as crossing, branching, and merging points, the link connects the nodes. A road is formed by connecting links.

The link length information 706 includes a lane ID 707 and link length 708. When the road is a road including a plurality of lanes such as two lanes or three lanes on one side, the lane ID 707 is identification information for identifying the lanes. The link length 708 is information indicating road lengths of the lanes.

The lane attribute information 711 includes a lane ID 712, a lane type 713, and planned vehicle speed 714. The lane type 713 is information indicating types of lanes such as a traveling lane, an overtaking lane, and a climbing lane. The planned vehicle speed (a predicted value of traveling vehicle speed) 714 is average vehicle speed in the case in which the own vehicle 10 travels in a lane indicated by the lane ID 712. As the planned vehicle speed, for example, average vehicle speed in each unit time can be used. The average vehicle speed is decided on the basis of traffic information in the past and can be changed according to time, a day of week, a singular day, a season, and the like. The planned vehicle speed may be calculated using a plurality of average vehicle speeds for each period of time, each day of week, or the like.

Information of the planned vehicle speed 714 for each of the lanes can be acquired from, for example, a server device of a traffic information management center that manages traffic information. The traffic information management center performs road-to-vehicle communication with vehicles traveling on a road using roadside machines disposed along the road, in crossings, and the like and calculates average vehicle speeds of the vehicles for each of links having link IDs, each of lanes, and the like. The traffic information management center calculates an average of the average vehicle speeds of the vehicles for each of the lanes and stores the average in the server device as planned vehicle speed of the lane. The traffic information management center provides the vehicles with information concerning the planned vehicle speed for each of the lanes through the road-to-vehicle communication by the roadside machines.

The configuration of the lane change coefficient table TB is explained with reference to FIG. 8. In the lane change coefficient table, a distance from the present position of the own vehicle 10 to an entrance point to a lane unchangeable section (hereinafter represented as "remaining distance of the lane changeable section" as appropriate) and a coefficient corresponding to the number of times of a lane change are registered. The lane changeable section and the lane unchangeable section are explained below.

The coefficient is a coefficient used in calculating a recommendation degree for each of lanes explained below. The coefficient is set to have a larger numerical value as the distance to the entrance point to the lane unchangeable section (the remaining distance of the lane changeable section) is shorter or the number of times of the lane change is larger. Note that a value of the coefficient registered in the lane change coefficient table may change according to a road. For example, a lane change coefficient table used when the own vehicle 10 travels on an expressway and a lane change coefficient table used when the own vehicle 10 travels on a general road are stored in the storing section 540. The recommended-lane selecting section 171 of the navigation ECU 170 explained below reads out, from the storing section 540, a lane change coefficient table corresponding to a type of road on which the own vehicle 10 is traveling. The recommended-lane selecting section 171 extracts, from the read-out lane change coefficient table, a lane change coefficient corresponding to the number of times of the lane change and the remaining distance of the lane changeable section and calculates a recommendation degree explained below.

FIG. 9 is a diagram used for explanation of the lane changeable section and the lane unchangeable section.

The lane changeable section is a section set as a section in which the own vehicle 10 can change a lane during the automatic traveling and is a section obtained by excluding the lane unchangeable section explained below in a section from the present position of the own vehicle 10 to the next branching portion or the like. The "branching portion or the like" means a point where, to pass through, when entering, the own vehicle 10 needs to travel in a specific lane such as a branching portion, a merging section, a toll gate, or the like that the own vehicle 10 is planned to pass through. The "next branching portion or the like" means a branching portion or the like where the own vehicle 10 reaches earliest through the automatic driving.

The lane unchangeable section is a section set as a section in which the own vehicle 10 cannot change a lane during the automatic traveling. In a section from the present position of the own vehicle 10 to the next branching portion or the like, a predetermined section formed immediately before the branching portion or the like is set as the lane unchangeable section. Since a traveling vehicle needs a predetermined distance to change a lane, the lane unchangeable section is set. In the lane unchangeable section, since a lane cannot be changed, before entering the lane unchangeable section, the own vehicle 10 needs to travel in a lane in which the own vehicle 10 should travel in order to pass through the branching portion or the like. The lane changeable section and the lane unchangeable section are set by means explained below.

As shown in FIG. 5, the recommended-lane selecting section 171 specifies the next branching portion or the like (step S10).

Subsequently, the recommended-lane selecting section 171 specifies a lane in which the own vehicle 10 is currently traveling and a lane in which the own vehicle 10 should travel when entering the next branching portion or the like (step S11). The control section 170 specifies an advancing direction in the branching portion or the like on the basis of the destination of the route guide, the present position of the own vehicle 10, and the map database 541 and specifies, on the basis of the specified advancing direction, a lane in which the own vehicle 10 should travel in a section immediately before the branching portion or the like. For example, when determining that the own vehicle 10 turns to the left in the branching portion, the control section 170 specifies a lane at the left end as the lane in which the own vehicle 10 should travel in the section immediately before the branching portion or the like.

After specifying the lane in which the own vehicle 10 is currently traveling and the lane in which the own vehicle 10 should travel in the section immediately before the next branching portion or the like, the recommended-lane selecting section 171 executes lane changeable section specifying processing (step S12). The lane changeable section specifying processing is processing for specifying the lane changeable section explained above. The lane changeable section specifying processing is explained in detail below with reference to the flowchart of FIG. 6.

After specifying the lane changeable section through the lane changeable section specifying processing, the recommended-lane selecting section 171 determines whether the present position of the own vehicle 10 is present within the lane changeable section (step S13). When the present position of the own vehicle 10 is absent within the lane changeable section (NO in step S13), the recommended-lane selecting section 171 ends the flow shown in FIG. 5. That is, when the present position is absent in the lane changeable section, the recommended-lane selecting section 171 ends the processing without selecting a recommended lane. Note that, when returning to the processing in S3 of the flowchart shown in FIG. 4 without selecting a recommended lane, the recommended-lane selecting section 171 returns the processing procedure to step S1.

When the present position of the own vehicle 10 is present within the lane changeable section (YES in step S13), the recommended-lane selecting section 171 calculates a traveling planned time for each of lanes (step S14). The recommended-lane selecting section 171 calculates the traveling planned time, for example, as explained below. First, the recommended-lane selecting section 171 calculates a remaining distance of the lane changeable section (a distance before entering the lane unchangeable section) for each of the lanes. For example, the recommended-lane selecting section 171 acquires the present position of the own vehicle 10 and a position of an entrance point of the lane unchangeable section and calculates the remaining distance of the lane changeable section reflecting the shape or the like of a road on the remaining distance on the basis of the information of the map database 541. Subsequently, the recommended-lane selecting section 171 acquires planned vehicle speed for each of the lanes and calculates a traveling planned time by dividing the remaining distance of the lane changeable section for each of the lanes by the planned vehicle speed for each of the lanes.

Subsequently, the recommended-lane selecting section 171 calculates, for each of the lanes, the number of times of a lane change to the lane specified in step S11 (step S15). For example, it is assumed that the road is a road including three lanes on one side and the lane specified in S11 is a lane at the left end. In this case, the number of times of the lane change is "0" time in the lane at the left end, the number of times of the lane change is "1" time in a lane in the center, and the number of times of the lane changes is "2" times in a lane at the "right end". Subsequently, the recommended-lane selecting section 171 calculates a lane change coefficient for each of the lanes from the lane change coefficient table TB on the basis of a distance of the lane changeable section foe each of the lanes calculated by processing explained below and the number of times of the lane change calculated in step S15 (step S16).

Subsequently, the recommended-lane selecting section 171 calculates a recommendation degree on the basis of the lane change coefficient acquired in S16 and the traveling planned time calculated in S14 (step S17) and selects a recommended lane on the basis of the calculated recommendation degree (step S18). Processing for calculating a recommendation degree is explained in detail below.

The recommended-lane selecting section 171 acquires information indicating the present position of the own vehicle 10 specified by the position specifying section 173. The recommended-lane selecting section 171 acquires, on the basis of the acquired information indicating the present position, from the map database 541, the link information 703 of a road on which the own vehicle 10 is located. Subsequently, the recommended-lane selecting section 171 calculates a recommendation degree of each of the lanes on the basis of the link information 703 using Equation (1) described below. The recommendation degree is a value calculated on the basis of the information concerning the lanes and serving as a reference in selecting a traveling lane. The recommendation degree indicates a degree of recommending traveling. The information concerning the vehicle speed includes planed vehicle speed and the number of times of the lane change for each of the lanes.

[Expression 1]

$$\text{Recommendation degree} = \frac{1}{\text{lane changeable section (km)} \div \text{planned vehicle speed}_b \text{ (km/h)} \times 3600 \times \text{lane change coefficient}} \quad (1)$$

First, the recommended-lane selecting section 171 divides the lane changeable section (km) by the planned vehicle speed (km/h) to calculate a traveling planned time in which the own vehicle 10 travels in the lane changeable section. "3600" shown in Equation (1) is a numerical value for converting a unit of the traveling planned time to "second". Subsequently, the recommended-lane selecting section 171 calculates the inverse of an integrated value obtained by integrating a traveling scheduled time, the unit of which is converted into second, and a lane change coefficient and sets the calculated value as a recommendation degree. As it is evident when Equation (1) is referred to, a numerical value of the recommendation degree is larger as the traveling planned time in which the own vehicle 10 travels in the lane changeable section is shorter. As the lane change coefficient, a coefficient having a smaller numerical value is selected as the remaining distance of the lane changeable section is longer. Therefore, the numerical value of the recommendation degree is larger the remaining distance of the lane changeable section is longer. As the lane change coefficient, a coefficient having a smaller numerical value is selected as the number of times of the lane change is smaller. Therefore, the numerical value of the recommendation degree is larger as the number of times of the lane change is smaller.

The calculation of the recommendation degree is specifically explained with reference to FIG. 10A to FIG. 10D. FIG. 10A is a diagram showing link length for each of lanes of a road including a plurality of lanes. FIG. 10B is a diagram showing planned vehicle speed for each of the lanes. FIG. 10C is a diagram showing a part of the lane change coefficient table TB. FIG. 10D is a diagram showing a recommendation degree for each of the lanes calculated according to the remaining distance of the lane changeable section.

When a lane that the own vehicle 10 should travel immediately before the next branch or the like is the lane having the lane ID "2" and the lane changeable section is 6 km, recommendation degrees of the lane "1" and the lane "2" are $1/\{6[km]/60[km/h]\times3600\times1\}=1/360$. Note that, since the lane changeable section is 6 km, the lane change coefficient is "1" in both of the lane having the lane ID "1" and the lane having the lane ID "2". When values of the recommendation degrees of the lane "1" and the lane "2" are the same, the recommended-lane selecting section 171 explained below may select any one of the lanes. However, the recommended-lane selecting section 171 may select, as the recommended lane, the lane having a smaller number of times of the lane change.

Similarly, a recommendation degree in the case in which the lane changeable section is 0.5 km is $1/\{0.5[km]/60[km/h]\times3600\times1\}=1/30$ in both of the lane having the lane ID "1" and the lane having the lane ID "2". In this case as well, since values of the recommendation degrees of the lane "1" and the lane "2" are the same, the recommended-lane selecting section 171 may select any one of the lanes. However, the recommended-lane selecting section 171 may select, as the recommended lane, the lane having a smaller number of times of the lane change.

Similarly, a recommendation degree in the case in which the lane changeable section is 0.3 km is $1/\{0.3[km]/60[km/h]\times3600\times2\}=1/36$ in the lane having the lane ID "1". Since the lane in which the own vehicle 10 should travel immediately before the branching portion or the like is the lane having the lane ID "2", the number of times of the lane change of the lane "1" is once and the lane change coefficient in the case in which the lane changeable section is 0.3 km is 2. In the lane having the lane ID "2", the recommendation degree is $1/\{0.3[km]/60[km/h]\times3600\times1\}=1/18$. Since the lane in which the own vehicle 10 should travel immediately before the branching portion or the like is the lane having the lane ID "2", the number of times of the lane change of the lane "2" is 0 time and the lane change coefficient in the case in which the lane changeable section is 0.3 km is 1. In this case, the recommended-lane selecting section 171 selects the lane "2" having the larger value of the recommendation degree as the recommended lane.

Similarly, a recommendation degree in the case in which the lane changeable section is 0.1 km is $1/\{0.1[km]/60[km/h]\times3600\times2\}=1/12$ in the lane having the lane ID "1". In the lane having the lane ID "2", the recommendation degree is $1/\{0.1[km]/60[km/h]\times3600\times1\}=1/6$. In this case, the recommended-lane selecting section 171 selects the lane "2" having the larger value of the recommendation degree as the recommended lane.

Note that, in Equation (1) described above, in the calculation of the recommendation degree, the values of both of the traveling planned time and the lane change coefficient are used. Besides, the recommendation degree may be calculated using only the traveling planned time without using the lane change coefficient. That is, the traveling planned time may be calculated using the planned vehicle speed for each of the lanes as information concerning the lane and using the lane changeable section and the planned vehicle speed. The recommendation degree may be calculated for each of the lanes. When the recommendation degree is calculated using the traveling planned time, a value of the recommendation degree is larger as the traveling planned time is shorter. Therefore, the lane in which the traveling planned time is short is selected as the recommended lane.

The recommendation degree may be calculated using only the lane change coefficient without using the traveling planned time. That is, the recommendation degree may be calculated for each of the lanes using the lane change coefficient for each of the lanes as information concerning the lane. When the recommendation degree is calculated using only the lane change coefficient, if the distance of the lane changeable section is the same, the recommendation degree is larger as the number of times of the lane change is smaller. Therefore, the lane in which the number of times of the lane change is small is selected as the recommended lane. As the remaining distance of the lane changeable section is shorter, rather than the lane in which the number of times of the lane change to the lane in which the own vehicle 10 travels immediately before the branching portion or the like is larger, the lane in which the number of times of the lane change is smaller is selected.

The recommended-lane selecting section 171 may calculate a traveling time and a link traveling time for each of the lanes and calculate the recommendation degree. The link traveling time is time predicted to be required by the own vehicle 10 to travel in the lane. The traveling time is a sum of link traveling times from a departure place to a destination, that is, time required to reach from the departure place to the destination. Note that the link traveling time is calculated by dividing link length by planned vehicle speeds of the lanes. As the planned vehicle speed used here, average vehicle speed can be used. The average speed is decided on the basis of the traffic information in the past and can be changed according to time, a day of week, a singular day, a season, and the like. The planned vehicle speed may be calculated using a plurality of average vehicle speeds for each period of time, each day of week, or the like.

Figure 11:
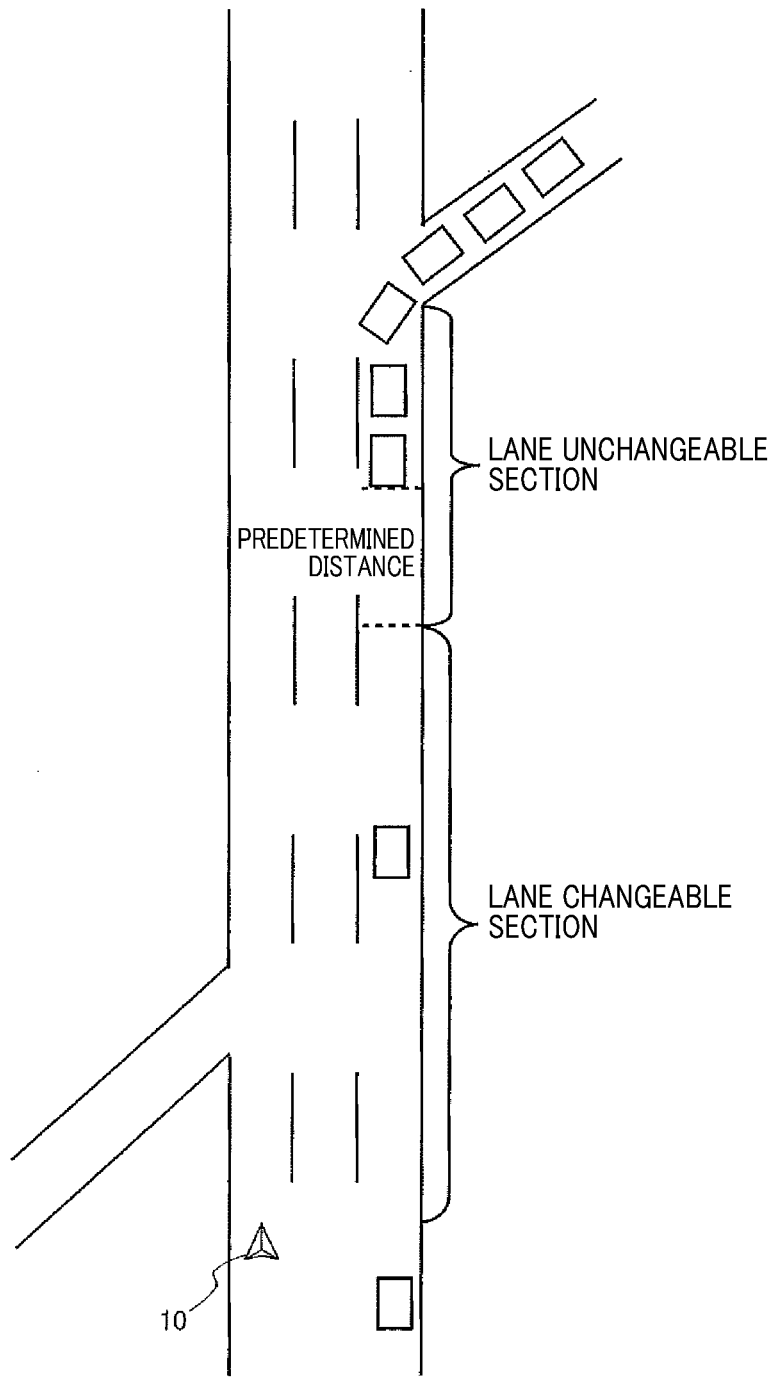

A value of the lane unchangeable section necessary in the calculation of the lane changeable section (km) may be set to a fixed value such as 100 m. When a traffic jam has occurred in the next branching portion or the like as shown in FIG. 11, a distance in a section in which the traffic jam has occurred may be added to a predetermined distance such as 100 m to set the lane unchangeable section. When acquiring information concerning planned vehicle speeds of the lanes from the traffic information management center and determining occurrence of a traffic jam, if average vehicle speed is lower than 40 km/h, the recommended-lane selecting section 171 may determine that a traffic jam has occurred.

When determining that the number of lanes decreases ahead of the own vehicle 10, the recommended-lane selecting section 171 may calculate the recommendation degree such that the lane change to a lane to which the lane change due to the lane decrease needs to be performed is not performed. For example, in the case of a lane that needs to be changed to another lane according to a decrease in the number of lanes, the recommended-lane selecting section 171 calculates the recommendation degree using Equation (2) described below. Note that, for a lane that does not need to be changed even if the number of lanes decreases, the recommendation degree is calculated by Equation (1) described above

[Expression 2]

$$\text{Recommendation degree} = \frac{(1)}{\text{lane changeable section (km)} \div \text{planned vehicle speedb (km/h)} \times 3600 \times \text{lane change coefficient} + \alpha} \quad (2)$$

A value of a shown in Equation (2) is a value set in advance. The recommendation degree of the lane that needs to be changed to anther lane according to the decrease in the number of lanes is set to be lower than the recommendation degrees of the other lanes. When a road on which the own vehicle 10 is traveling is a road on which a lane exclusive for the automatic driving is provided, when calculating the recommendation degree of the lane, the recommended-lane selecting section 171 may use the lane change coefficient lower than the lane change coefficient of the other lanes. When the road on which the own vehicle 10 is traveling is the road on which the lane exclusive for the automatic driving is provided, the recommended-lane selecting section 171 may calculate the recommendation degree by subtracting a value of a of Equation (2) described above. Note that the lane change coefficient and a are absolute numbers.

The recommended-lane selecting section 171 selects, on the basis of the recommendation degree of each of the lanes, a recommended lane in which the own vehicle 10 should travel. The recommended-lane selecting section 171 selects, as the recommended lane, a lane having the largest value of the recommendation degree. Note that, when the lane changeable section is absent between the present position and the next branching portion or the like, the recommended-lane selecting section 171 of the control section 170 may select, as the recommended lane, a lane in which the own vehicle 10 should travel immediately before the next branching portion or the like. In this case, the control section 170 may forcibly change a lane to the lane in which the own vehicle 10 should travel immediately before the next branching portion or the like. When the distance from the present position to the next branching portion or the like is short, that is, the present position is close to the branching portion or the like, the control section 170 selects the recommended lane not to change the lane in the opposite direction. Specifically, when the present position is close to the branching portion or the like, the control section 170 does not perform the lane change to a lane that extends away from the lane in which the own vehicle 10 should travel immediately before the next branching portion or the like.

A selection method for the recommended lane by the recommended-lane selecting section 171 is explained with reference to FIG. 12. FIG. 12 shows recommendation degrees corresponding to distances of the lane changeable section of the lane having the lane ID "1" and the lane having the lane ID "2". The recommended-lane selecting section 171 selects, as the recommended lane, the lane having a large value of the recommendation degree. For example, when the lane changeable section is 25 km, the recommendation degree of the lane having the lane ID "1" is "1/1125" and the recommendation degree of the lane having the lane ID "2" is "1/1000". In this case, since the recommendation degree of the lane having the lane ID "2" is larger than the recommendation degree of the lane having the lane ID "1". Therefore, the recommended-lane selecting section 171 selects the lane having the lane ID "2" as the recommended lane.

The lane changeable section specifying processing in step S12 of FIG. 5 is explained in detail with reference to FIG. 6.

First, the control section 170 specifies, as the lane changeable section, a section within 100 m before the branching portion or the like specified in step S10 in FIG. 5 (step S21). Subsequently, the control section 170 acquires traffic information using the road-to-vehicle communication device 320 (step S22). After acquiring the traffic information, the control section 170 determines on the basis of the acquired traffic information whether a traffic jam has occurred in the lane specified in step S11, that is, a section of a straight line of the branching portion or the like specified in step S10 (step S23).

When determining that a traffic jam has occurred (YES in step S23), the control section 170 sets, as a new lane unchangeable section, a section obtained by adding, to the lane unchangeable section specified in step S21, a jam section continuing from the branching portion or the like (step S24). When a traffic jam has occurred in a lane in which the own vehicle 10 should travel in entering the branching portion or the like, it is necessary to change a lane to the lane at an earlier stage compared with when a traffic jam has not occurred. This is because, as the own vehicle 10 travels closer to the branching portion or the like, the own vehicle 10 is more likely to be affected by the traffic jam and it is more likely that the lane cannot be changed to the lane. By setting the lane unchangeable section according to the method explained above, it is possible to set the lane unchangeable section to an appropriate section reflecting an actual situation of the traffic jam. It is possible to reduce the likelihood that the own vehicle 10 cannot change a lane to a lane corresponding to the section because of the influence of the traffic jam. Subsequently, the control section 170 sets, as the lane changeable section, a section excluding the lane unchangeable section in the section from the present position to the next branching portion or the like (step S25).

[Modification]

In the processing flow shown in FIG. 5, in step S14, the traveling planned time is calculated for each of the lanes and the recommendation degrees of the lanes are calculated on the basis of the calculated traveling planned time. However, it is also possible to measure an inter-vehicle distance between the own vehicle 10 and a vehicle traveling ahead of the own vehicle 10 and calculate the recommendation degree for each of the lanes on the basis of the measured inter-vehicle distance. A calculation procedure for the inter-vehicle distance is explained below.

Figure 13:
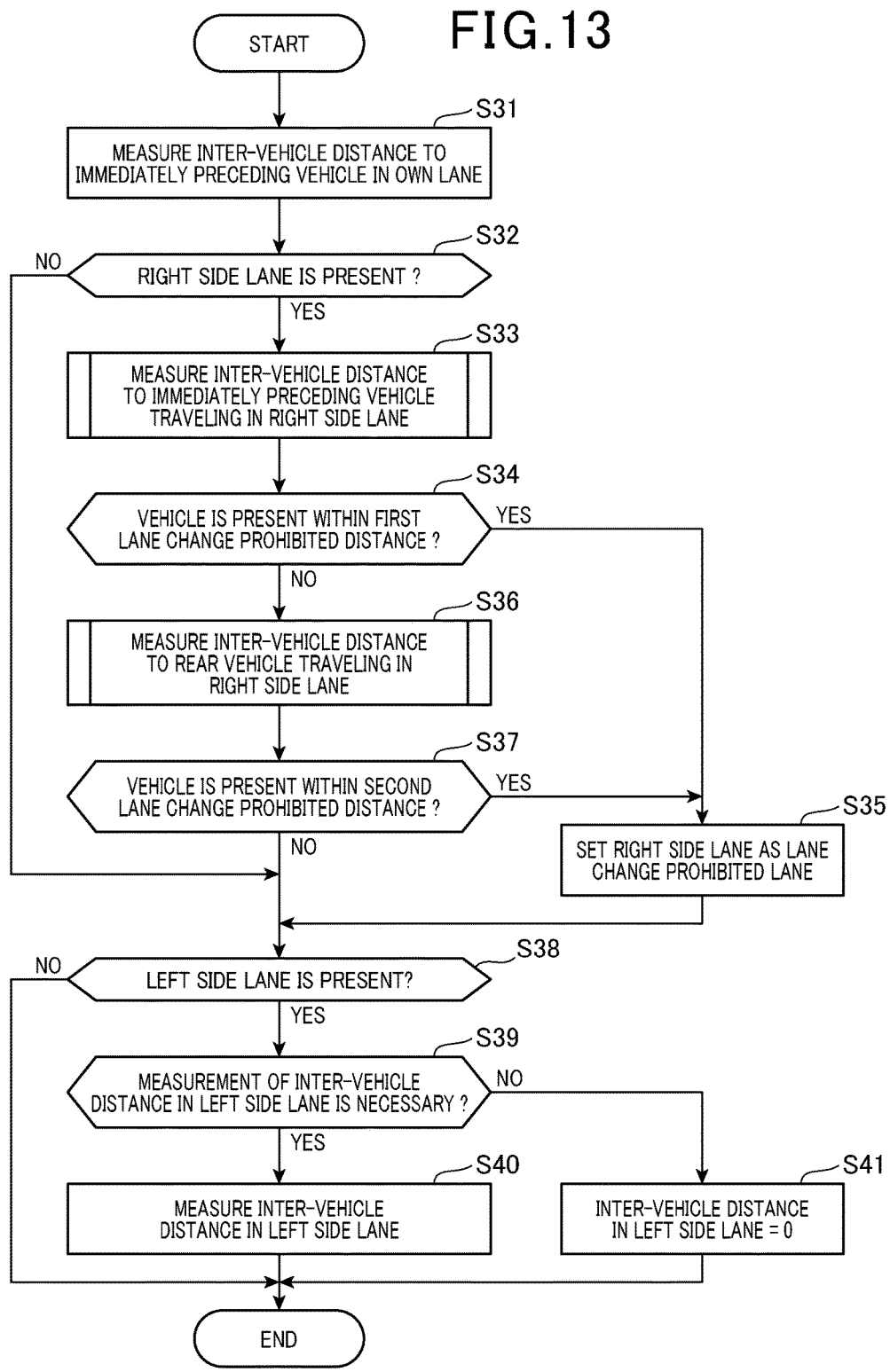
FIG. 13 is a flowchart showing a measurement procedure for an inter-vehicle distance.

FIG. 13 is a flowchart showing a measurement procedure of an inter-vehicle distance.

First, the recommended-lane selecting section 171 of the control section 170 measures a distance between the own vehicle 10 and a vehicle traveling immediately preceding the own vehicle 10 (hereinafter referred to as immediately preceding vehicle) in a traveling lane of the own vehicle 10 (hereinafter referred to as own lane) (step S31). The recommended-lane selecting section 171 instructs the radar device 330 to measure an inter-vehicle distance and acquires information concerning an inter-vehicle distance to the immediately preceding vehicle according to preceding vehicle information input from the radar device 330. The recommended-lane selecting section 171 acquires the information concerning the inter-vehicle distance to the immediately preceding vehicle on the basis of the acquired preceding vehicle information. When a stereo camera is mounted as the camera 341, the recommended-lane selecting section 171 may measure the inter-vehicle distance to the immediately preceding vehicle on the basis of a photographed image photographed by the stereo camera.

Subsequently, the recommended-lane selecting section 171 determines whether a traveling lane is present on the right side of the own lane (hereinafter referred to as right side lane) (step S32). The recommended-lane selecting section 171 determines, for example, on the basis of a photographed image of the camera 341 whether a lane is present on the right side of the own lane (step S32). When determining that the right side lane is present (YES in step S32), the recommended-lane selecting section 171 instructs the radar device 330 to measure an inter-vehicle distance to an immediately preceding vehicle traveling in the right side lane (step S33). The immediately preceding vehicle traveling in the right side lane indicates a vehicle traveling ahead of the own vehicle 10 and closest to the own vehicle 10. Note that details of this processing are explained with reference to a flowchart shown in FIG. 15.

Subsequently, the recommended-lane selecting section 171 determines on the basis of the inter-vehicle distance measured in step S33 whether the inter-vehicle distance to the immediately preceding vehicle traveling in the right side lane is within a first lane change prohibited distance (step S34).

Figure 14:
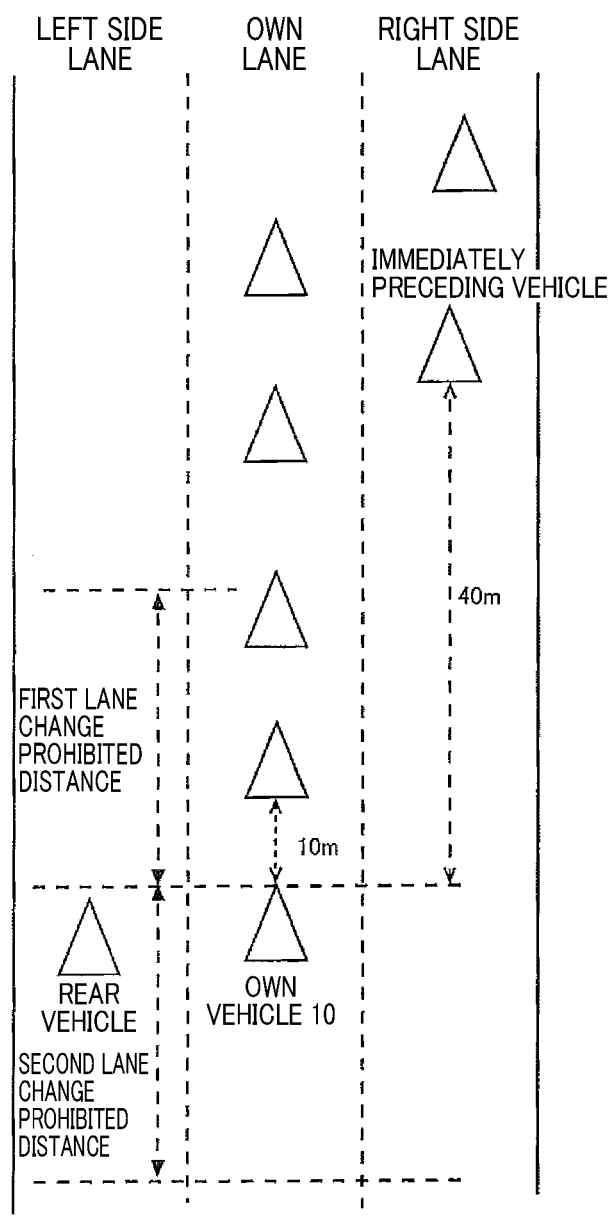
FIG. 14 is a diagram showing a first lane change prohibited distance and a second lane change prohibited distance.

FIG. 14 is a diagram for explaining a first lane change prohibited distance and a second lane change prohibited distance. The first lane change prohibited distance is explained with reference to FIG. 14. FIG. 14 shows three lanes on a side on which the own vehicle 10 travels of a road including three lanes on one side. The own vehicle 10 travels in the center lane among the three lanes. In the left side lane, a range of the first lane change prohibited distance based on the position of the own vehicle 10 is shown.

The first lane change prohibited distance is a distance in which, when a vehicle traveling in a range of the distance is present, the own vehicle 10 is prohibited from changing a lane to a lane in which the vehicle is traveling. The first lane change prohibited distance is set in a range ahead of the own vehicle 10, that is, a range of a distance set in advance from the own vehicle 10. The first lane change prohibited distance is set to a distance shorter than a minimum value of an inter-vehicle distance in which the own vehicle 10 can safely perform the lane change. The minimum value of the inter-vehicle distance is set, for example, on the basis of the present vehicle speed of the own vehicle 10.

When the measured inter-vehicle distance to an immediately preceding vehicle traveling in the right side lane is equal to or smaller than the first lane change prohibited distance, the recommended-lane selecting section 171 sets the right side lane as a lane change prohibited lane (step S35).

Subsequently, the recommended-lane selecting section 171 performs measurement of an inter-vehicle distance to a rear vehicle traveling in the right side lane (step S36). The rear vehicle is a vehicle traveling in parallel to the own vehicle 10 or a vehicle traveling behind the own vehicle 10. The vehicle traveling in parallel to the own vehicle 10 is a vehicle, a vehicle body of which overlaps the own vehicle 10 in the width direction of the road.

When the radar device 330 is mounted to be capable of detecting a vehicle behind the own vehicle 10, the recommended-lane selecting section 171 measures an inter-vehicle distance to the vehicle traveling behind the own vehicle 10 on the basis of rear vehicle information measured by the radar device 330. The rear vehicle information includes information such as presence or absence information of a rear vehicle, a distance (an inter-vehicle distance) to the rear vehicle, an angle (a relative position), speed (relative speed), and acceleration. When a rear camera that photographs the rear of the own vehicle 10 is mounted on the own vehicle 10 as the camera 341 and the camera 341 is a stereo camera, the inter-vehicle distance to the rear vehicle can be measured on the basis of a photographed image of the camera 341. Details of a processing flow for measuring the inter-vehicle distance to the rear vehicle are also explained with reference to the flowchart shown in FIG. 15.

Subsequently, the recommended-lane selecting section 171 determines on the basis of the inter-vehicle distance measured in step S36 whether the rear vehicle is present within the second lane change prohibited distance (step S37).

The second lane change prohibited distance is shown in FIG. 14. The second lane change prohibited distance is set within a range behind the head of the vehicle body of the own vehicle 10, that is, a range of a distance set in advance from the head of the vehicle body of the own vehicle 10. The second lane change prohibited distance is set to a distance shorter than the minimum value of the inter-vehicle distance in which the own vehicle 10 can safely perform the lane change. The minimum value of the inter-vehicle distance is set, for example, on the basis of the present vehicle speed of the own vehicle 10.

When the inter-vehicle distance to the rear vehicle traveling in the right side lane is equal to or smaller than the second lane change prohibited distance (YES in step S34), the recommended-lane selecting section 171 sets the right side lane as a lane change prohibited lane (step S35).

When the determination in step S32 or the determination in step S37 is negative determination, the recommended-lane selecting section 171 determines whether a lane is present on the left side of the own lane (hereinafter referred to as left side lane) (step S38). The recommended-lane selecting section 171 determines whether the left side lane is present according to a method same as step S32.

When determining that the left side lane is absent (NO in step S38), the recommended-lane selecting section 171 ends this processing flow. When determining that the left side lane is present (YES in step S38), the recommended-lane selecting section 171 determines whether measurement of an inter-vehicle distance to the vehicle traveling in the left side lane is necessary (step S39). The recommended-lane selecting section 171 determines on the basis of the inter-vehicle distance to the immediately preceding vehicle traveling in the own lane measured in step S31 whether the measurement of the inter-vehicle distance to the immediately preceding vehicle traveling in the left side lane is necessary. When the inter-vehicle distance to the immediately preceding vehicle traveling in the own lane is equal to or larger than a threshold set in advance and the own vehicle 10 is traveling while being greatly separated from the immediately preceding vehicle traveling in the own lane, the recommended-lane selecting section 171 determines that it is unnecessary to perform the lane change to the left side lane. Therefore, the recommended-lane selecting section 171 determines that the measurement of the inter-vehicle distance to the immediately preceding vehicle traveling in the left side lane is unnecessary.

The recommended-lane selecting section 171 determines on the basis of the inter-vehicle distance to the immediately preceding vehicle traveling in the right side lane measured in step S33 and the setting of the lane change prohibited lane set in step S35 whether measurement of the inter-vehicle distance to the vehicle traveling in the left side lane is necessary. When the inter-vehicle distance to the immediately preceding vehicle traveling in the right side lane is equal to or larger than the threshold set in advance and the right side lane is not set as the lane change prohibited lane, the recommended-lane selecting section 171 determines that it is unnecessary to perform the lane change to the left side lane. This determination is based on the premise that overtaking of a vehicle is performed from the right side of the vehicle. Therefore, the recommended-lane selecting section 171 determines that the measurement of the inter-vehicle distance to the immediately preceding vehicle traveling in the left side lane is unnecessary.

When determining in step S39 that the measurement of the inter-vehicle distance to the vehicle traveling in the left side lane is necessary (YES in step S39), the recommended-lane selecting section 171 measures inter-vehicle distances to the immediately preceding vehicle and the rear vehicle traveling in the left side lane according to a method same as step S33 (step S40). When determining that the measurement of the inter-vehicle distance to the vehicle traveling in the left side lane is unnecessary (NO in step S39), the recommended-lane selecting section 171 sets the inter-vehicle distance to the immediately preceding vehicle to "0" m in all left side lanes located on the left side of the own lane (step S41). Since the inter-vehicle distance to the immediately preceding vehicle is set to "0" m, the recommended-lane selecting section 171 excludes, from targets of the lane change, the lanes in which the inter-vehicle distance is set to "0" m.

When determining that the measurement of the inter-vehicle distance in the left side lane is unnecessary and setting the inter-vehicle distance to "0" m or measuring the inter-vehicle distance in the left side lane, the recommended-lane selecting section 171 performs the processing in steps S15 and S16 of the flowchart shown in FIG. 5 and calculates recommendation degrees of the lanes (step S17). In the setting of the recommendation degrees, when the lane set as the lane change prohibited lane by the processing in step S35 is present, the recommended-lane selecting section 171 does not calculate a recommendation degree for the lane. The lane for which the recommendation degree is not calculated is excluded from target lanes of the lane change.

When calculating a recommendation degree of a lane, the recommended-lane selecting section 171 uses, instead of the traveling planned time (the lane changeable section/the planned vehicle speed) explained above, a value obtained by converting the inter-vehicle distance measured by the processing flow shown in FIG. 13 into a coefficient corresponding to the inter-vehicle distance. The coefficient is, for example, a coefficient set to have a smaller value as the inter-vehicle distance is larger. The coefficient is stored in the storing section 540 like the lane change coefficient table TB. Note that, as the coefficient corresponding to the inter-vehicle distance, values are not set for distances corresponding to the first lane change prohibited distance and the second lane change prohibited distance.

The recommended-lane selecting section 171 calculates, as a recommendation degree, the inverse of a multiplied value obtained by multiplying the coefficient corresponding to the inter-vehicle distance with the lane change coefficient.

Note that the recommended-lane selecting section 171 may select, as the recommended lane, a lane having the longest inter-vehicle distance among the measured inter-vehicle distance to the immediately preceding vehicle in the own lane, the measured inter-vehicle distance to the immediately preceding vehicle in the right side lane, and the measured inter-vehicle distance to the immediately preceding vehicle in the left side lane without calculating a recommendation degree.

Note that, in steps S31, S33, and S39 shown in FIG. 13, when the immediately preceding vehicle set as the measurement target of the inter-vehicle distance starts the lane change and the immediately preceding vehicle is striding across a lane boundary line, the recommended-lane selecting section 171 may end the processing flow shown in FIG. 13 and stay on standby until the lane change of the immediately preceding vehicle ends. When a vehicle that performs the lane change and cuts in is present between the own vehicle 10 and the immediately preceding vehicle set as the measurement target of the inter-vehicle distance and the vehicle is striding across the lane boundary line, the recommended-lane selecting section 171 may end the processing flow shown in FIG. 13 and stay on standby until the lane change of the vehicle ends.

The immediately preceding vehicle set as the measurement target that starts the lane change or the vehicle that performs the lane change and cuts in is flashing a blinker but is traveling within a traveling lane of the vehicle and is not striding across the lane boundary line, the recommended-lane selecting section 171 may continue the measurement of the inter-vehicle distance.

Figure 15:
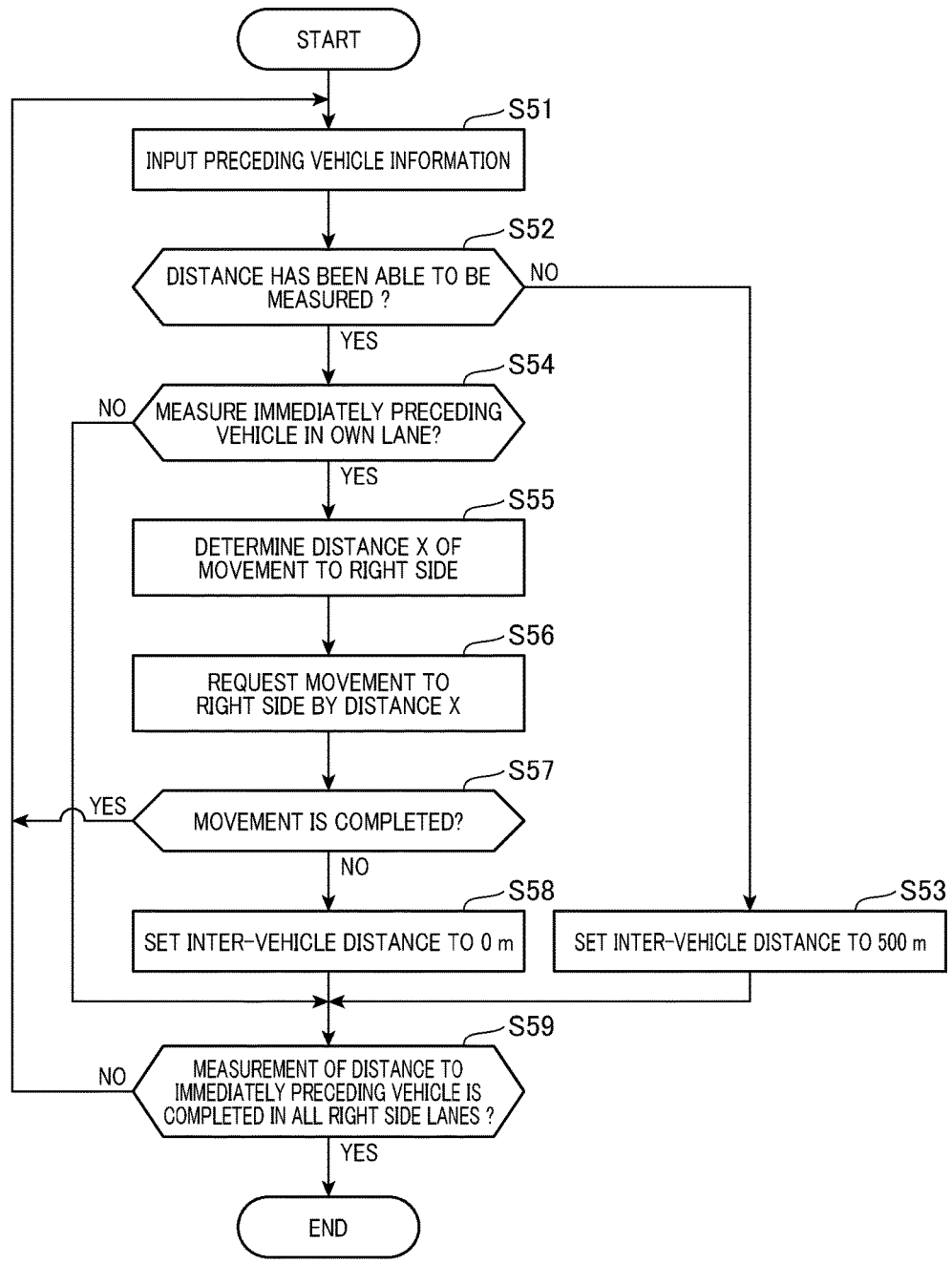
FIG. 15 is a flowchart showing a procedure for measuring an inter-vehicle distance of a right side lane.

Details of step S33 shown in FIG. 15 are explained. FIG. 15 is a flowchart showing a procedure for measuring an inter-vehicle distance of the right side lane.

First, preceding vehicle information measured by the radar device 330 is input to the recommended-lane selecting section 171 (step S51). The recommended-lane selecting section 171 determines on the basis of the input preceding vehicle information whether an inter-vehicle distance to an immediately preceding vehicle has been able to be measured (step S52). When an inter-vehicle distance to the immediately preceding vehicle has not been able to be measured (NO in step S52), that is, when an immediately preceding vehicle is absent within a range in which a distance is measurable by the radar device 330, the recommended-lane selecting section 171 determines that an immediately preceding vehicle is absent in at least the range in which a distance is measurable by the radar device 330 in the right side lane and sets the inter-vehicle distance on the basis of a maximum distance measurable by the radar device 330. For example, if the radar device 330 can measure up to 500 m, the recommended-lane selecting section 171 sets the inter-vehicle distance to 500 m (step S53). However, a set value of the inter-vehicle distance does not have to be a value equal to the measurable maximum distance.

When an inter-vehicle distance to an immediately preceding vehicle has been able to be measured (YES in step S52), the recommended-lane selecting section 171 determines whether the measured inter-vehicle distance is an inter-vehicle distance to an immediately preceding vehicle traveling in the own lane (step S54). The recommended-lane selecting section 171 determines on the basis of information concerning an angle (a relative position) with respect to the preceding vehicle included in the preceding vehicle information whether the measured inter-vehicle distance is the inter-vehicle distance to the immediately preceding vehicle traveling in the own lane.

When determining that the measured inter-vehicle distance is not the inter-vehicle distance to the immediately preceding vehicle traveling in the own lane (NO in step S54), the recommended-lane selecting section 171 registers the measured inter-vehicle distance as an inter-vehicle distance to an immediately preceding vehicle traveling in the right side lane and shifts to processing in step S59.

When determining that the measured inter-vehicle distance is the inter-vehicle distance to the immediately preceding vehicle traveling in the own lane (YES in step S54), the recommended-lane selecting section 171 determines that an inter-vehicle distance to an immediately preceding vehicle traveling in the right side lane has not been able to be measured and determines a distance X for moving the own vehicle 10 to the right side in the own lane (step S55).

FIG. 16A illustrates a case in which an inter-vehicle distance to an immediately preceding vehicle traveling in the right side lane cannot be measured by the radar device 330. For example, when the own vehicle 10 excessively approaches an immediately preceding vehicle traveling in the own lane, a radio wave emitted from the radar device 330 is reflected on the immediately preceding vehicle traveling in the own lane. The inter-vehicle distance to the immediately preceding vehicle traveling in the right side lane sometimes cannot be measured. In such a case, the recommended-lane selecting section 171 moves the own vehicle 10 to the right side in the own lane such that the radio wave emitted from the radar device 330 is not reflected on the immediately preceding vehicle in the own lane.

The recommended-lane selecting section 171 may use, as the distance X, a fixed value (e.g., 0.2 m) set in advance. Alternatively, the recommended-lane selecting section 171 may calculate a distance to a lane boundary line on the basis of a photographed image of the camera 341 and set the moving distance X on the basis of the calculated distance. The lane boundary line is a boundary line that separates the own lane and the right side lane.

When detecting on the basis of the photographed image of the camera 341 that a vehicle traveling in the right side lane is traveling in parallel to the own vehicle 10, the recommended-lane selecting section 171 may calculate a distance in the road width direction between the vehicle traveling in parallel and the own vehicle 10 and set, as the distance X, a value obtained by subtracting a safety margin from the calculated distance. Further, when a vehicle traveling in parallel to the own vehicle 10 in the right side lane is present, the recommended-lane selecting section 171 may stop the processing flow shown in FIG. 15.

After determining the distance X, the recommended-lane selecting section 171 requests the vehicle control ECU 200 to move the own vehicle 10 to the right side by the distance X (step S56).

In FIG. 16B, a state is shown in which the own vehicle 10 is moved to the right side by the distance X in the own lane. The recommended-lane selecting section 171 determines the own vehicle 10 to the right side by the distance X and moves the own vehicle 10 to a position where the radio wave emitted from the radar device 330 reaches the immediately preceding vehicle traveling in the right side lane.

When being requested by the recommended-lane selecting section 171 to move the own vehicle 10 to the right side, the vehicle control ECU 200 determines whether the movement of the own vehicle 10 to the right side is possible. The vehicle control ECU 200 determines on the basis of the photographed image of the camera 341 whether it is possible to move a traveling position of the own vehicle 10 to the right side in the own lane. For example, when detecting that a motorcycle is approaching from the rear of the own lane, the vehicle control ECU 200 determines that the motorcycle is likely to overtake the own vehicle 10 from the right side and prohibits movement of the own vehicle 10 to the right side. If the distance to the vehicle traveling in parallel to the own vehicle 10 in the right side lane becomes shorter than a distance set in advance when the own vehicle 10 is moved to the right side, the vehicle control ECU 200 prohibits the movement of the own vehicle 10 to the right side. In this case, the vehicle control ECU 200 notifies the recommended-lane selecting section 171 that the movement of the own vehicle 10 to the right side is prohibited.

When determining that the movement of the own vehicle 10 to the right side is possible, the vehicle control ECU 200 notifies the recommended-lane selecting section 171 of a response to the effect that the movement to the right side is possible. The vehicle control ECU 200 causes a display panel (not shown in the figure) of the own vehicle 10 to display to the effect that the own vehicle 10 is moved to the right side in the own lane. The vehicle control ECU 200 generates a control signal for moving the own vehicle 10 by the distance X and outputs the control signal to the steering ECU 140. When the movement of the own vehicle 10 to the right side is completed, the vehicle control ECU 200 notifies the recommended-lane selecting section 171 to the effect that the movement is completed.

When receiving the notification to the effect that the movement is completed from the vehicle control ECU 200, the recommended-lane selecting section 171 determines that the movement of an own vehicle position to the right side in the own lane is completed (YES in step S57), returns to step S51, and performs measurement of an inter-vehicle distance again.

When receiving a response to the effect that the movement of the own vehicle 10 to the right side is prohibited or when the response to the effect that the movement of the own vehicle 10 is completed cannot be received from the vehicle control ECU 200 even if a predetermined time elapses, the recommended-lane selecting section 171 determines that the movement by the distance X is not completed (NO in step S57) and sets the inter-vehicle distance to the immediately preceding vehicle in the right side lane to "0" m (step S48). Since the inter-vehicle distance is set to "0" m, a lane in which the inter-vehicle distance is set to "0" m is excluded from candidates of the lane change.

Subsequently, the recommended-lane selecting section 171 determines whether measurement of an inter-vehicle distance to an immediately preceding vehicle is ended in all lanes on the right side of the own lane (step S59). When a lane in which an inter-vehicle distance is not measured is present (NO in step S59), the recommended-lane selecting section 171 selects the lane in which an inter-vehicle distance is not measured and causes the radar device 330 to measure an inter-vehicle distance to an immediately preceding vehicle traveling in the lane.

A processing procedure for measuring an inter-vehicle distance to a rear vehicle traveling in the right side lane is substantially the same as the processing flow shown in FIG. 15. Therefore, detailed explanation of the processing procedure is omitted.

In the processing flow for measuring the inter-vehicle distance to the rear vehicle traveling in the right side lane, "a step of inputting preceding vehicle information" in step S51 shown in FIG. 15 is changed to "a step of inputting rear vehicle information". The rear vehicle information is measured by the radar device 330. The rear vehicle information includes information such as presence or absence information of a rear vehicle, a distance (an inter-vehicle distance) to the rear vehicle, an angle (a relative position), speed (relative speed), and acceleration.

"A step of determining whether an inter-vehicle distance between the own vehicle 10 and the immediately preceding vehicle is measured" is changed to "a step of determining whether an inter-vehicle distance to a vehicle traveling immediately after the own vehicle 10 in the own lane is measured".

Figure 17:
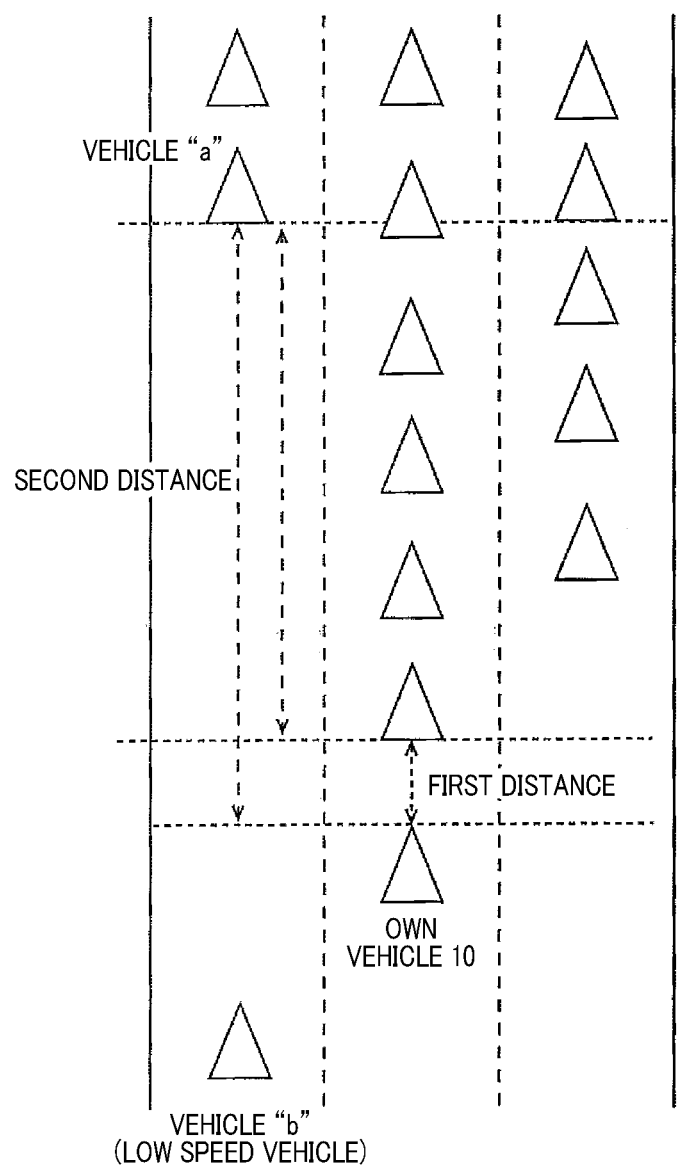
FIG. 17 is a diagram for explaining another calculation method for a recommendation degree.

Another method of calculating a recommendation degree is explained with reference to FIG. 17. FIG. 17 is a diagram for explaining another method of calculating a recommendation degree and shows a lane on a side on which the own vehicle 10 travels in a road including three lanes on one side.

The own vehicle 10 travels in the center lane among the three lanes. Congestion states are the same degree in all the lanes. However, since a vehicle (hereinafter referred to as vehicle "b") traveling at lower speed than other vehicles is traveling in the left side lane, an inter-vehicle distance is large. In such a road situation, even if the lane change is performed from the center lane to the left side lane, since the congestion states of the lanes are the same degree, an effect of reducing a traveling time is not obtained. The lane change is unnecessary.

In order to prevent such an unnecessary lane change from being performed, the recommended-lane selecting section 171 may calculate a recommendation degree using Equation (3) described below, for example, when vehicle speed measured by the vehicle speed sensor 350 decreases to a predetermined value (e.g., 30 km/h) or less.

Recommendation degree=(second distance−first distance)×imaginary speed difference/lane change coefficient    (3)

The first distance is an inter-vehicle distance between the own vehicle 10 and an immediately preceding vehicle in the own lane. The second distance is an inter-vehicle distance to an immediately preceding vehicle in a lane set as a target of calculation of a recommendation degree. In an example shown in FIG. 17, the target lane is the left side lane. An inter-vehicle distance between a vehicle "a" traveling immediately preceding the own vehicle 10 in the left side lane and the own vehicle 10 is the second distance.

The imaginary speed distance is a difference between vehicle speed of the immediately preceding vehicle traveling in the target lane and vehicle speed of the own vehicle 10. In the example shown in FIG. 17, the imaginary speed difference is a difference between vehicle speed of the vehicle "a" traveling in the left side lane and the vehicle speed of the own vehicle 10. The difference between the vehicle speed of the vehicle "a" and the vehicle speed of the own vehicle 10 may be measured by the radar device 330. It is also possible to photograph the vehicle "a" a plurality of times with the camera 341 and calculate the vehicle speed of the vehicle "a" from images photographed by the plurality of times of photographing. When the difference between the vehicle speed of the vehicle "a" and the vehicle speed of the own vehicle 10 cannot be measured, regulated speed of a road on which the own vehicle 10 is traveling may be regarded as the vehicle speed of the vehicle "a". A difference between the regulated speed and the speed of the own vehicle 10 may be used instead of the difference between the vehicle speed of the vehicle "a" and the vehicle speed of the own vehicle 10.

The lane change coefficient can be acquired from the lane change coefficient table TB shown in FIG. 8 on the basis of the remaining distance of the lane changeable section and the number of times of the lane change. Note that the number of times of the lane change is the number of times of the lane change in the case in which a lane is changed from the own lane to the target lane.

When a value of the second distance is smaller than a value of the first distance, a value of the recommendation degree is a minus value. In such a case, the recommended-lane selecting section 171 may determine that the own vehicle 10 continues to travel in the own lane rather than changing a lane to the lane in which the recommendation degree is minus.

As explained above, when the road on which the own vehicle 10 is traveling is a road including a plurality of lanes, the control section 170 in this embodiment calculates a recommendation degree of each of the lanes of the road, on which the own vehicle 10 is traveling, on the basis of information concerning the lane and selects a traveling lane. Therefore, it is possible to select an optimum traveling lane corresponding to a road situation.

Since the recommendation degree is calculated for each of the lanes using planned vehicle speed of each of the lanes as information concerning the lane, it is possible to select a lane in which traveling vehicle speed is high as a recommended lane.

The control section 170 specifies a lane in which the own vehicle 10 should travel in a section immediately preceding a branching point, uses the number of times of the lane change to a lane specified from the lane in which the own vehicle 10 is currently traveling as information concerning the lane, and calculates recommendation degrees of the lanes. Therefore, it is possible to prevent a frequent lane change.

As the remaining distance from the present position to the lane unchangeable section is shorter, a lane in which the number of times of the lane change is larger is not selected. Therefore, it is possible to reduce the number of times of the lane change just before the branching point or the like and prevent occurrence of a situation in which, because of a sudden traffic jam or the like, a lane cannot be changed to a lane in which the own vehicle 10 should travel.

When determining according to traffic information that a traffic jam occurs in a lane, the control section 170 changes the length of the lane unchangeable section. Therefore, it is possible to prevent occurrence of a situation in which a lane cannot be changed to a lane in which the own vehicle 10 should travel.

When it is determined that the number of lanes of a road decreases ahead of a vehicle, the control section 170 calculates a recommendation degree such that the lane change to a lane to which the lane change needs to be performed because of the decrease in the number of lanes is not performed. Therefore, it is possible to prevent the lane change to a lane that disappears because of the reduction in the number of lanes from being performed.

The own vehicle 10 is mounted with the radar device 330 that measures an inter-vehicle distance to a vehicle located ahead of the own vehicle 10. The recommended-lane selecting section 171 calculates recommendation degrees of the lanes on the basis of the inter-vehicle distance measured by the radar device 330. Therefore, it is possible to calculate the recommendation degrees of the lanes on the basis of inter-vehicle distances in the lanes. It is possible to select an optimum traveling lane corresponding to a road situation.

When a lane in which an inter-vehicle distance to a vehicle located ahead is determined as being equal to or larger than a distance set in advance is detected, the recommended-lane selecting section 171 instructs the radar device 330 not to measure inter-vehicle distances in the other lanes. Therefore, it is possible to prevent unnecessary processing from being performed.

The recommended-lane selecting section 171 calculates a recommendation degree of a lane in which the radar device 330 cannot measure an inter-vehicle distance to a vehicle located ahead to be lower than recommendation degrees of the other lanes in which inter-vehicle distances can be measured. Therefore, it is possible to prevent a lane in which an inter-vehicle distance cannot be measured from being selected as a traveling lane.

When an inter-vehicle distance measured by the radar device 330 is an inter-vehicle distance to a vehicle traveling ahead of the own vehicle 10 in the own lane in which the own vehicle 10 travels and inter-vehicle distances to other vehicles traveling ahead of the own vehicle 10 in the lanes other than the own lane cannot be measured, the recommended-lane selecting section 171 instructs the vehicle control ECU 200, which controls the traveling of the own vehicle 10, to move the own vehicle 10 to, in the traveling lane, a lane side on which the other vehicles travels. Therefore, it is possible to change a traveling position in the own lane of the own vehicle 10 and enable the inter-vehicle distances to the vehicles traveling in the other lanes to be measured.

Note that, in the embodiment explained above, the example is explained in which the own vehicle 10 travels according to the control by the control section 170. That is, the example is explained in which the own vehicle 10 travels according to full-automatic driving by the control by the control section 170. However, when a road includes a plurality of lanes, processing for calculating a recommendation degree of each of the lanes and selecting a road in which the own vehicle 10 travels can be executed even when the own vehicle 10 is not performing the full-automatic driving. That is, even when the own vehicle 10 is traveling according to manual operation by the driver, it is also possible to calculate a recommendation degree of each of the lanes to select a recommended lane and display the selected recommended lane on the display panel 564.

Automatic driving other than the full-automatic driving includes, for example, specific function automatic driving and composite function automatic driving. The specific function automatic driving is a mode in which any one of accelerating operation, braking operation, and steering operation is supported by the automatic driving support system 1. The composite function automatic driving is a mode in which at least two kinds of driving operation among the accelerating operation, the braking operation, and the steering operation are supported by the automatic driving support system 1.

Functions for supporting the accelerating/braking operation include, for example, ACC (Adaptive Cruise Control) and CACC (Cooperative Adaptive Cruise Control). The ACC is a system for keeping constant an inter-vehicle distance to a preceding vehicle traveling ahead using the radar device 330 mounted in front of the vehicle and warning the driver according to necessity. The CACC is a system for sharing acceleration and deceleration information of the preceding vehicle through vehicle-to-vehicle communication to perform more precise inter-vehicle distance control in addition to the function of the ACC. A function for supporting the steering operation of the driver includes an LKAS (Lane Keep Assist System). The LKAS is a system for detecting a white line using the camera device 340 in the front of the vehicle and supporting steering wheel operation such that the vehicle keeps the traveling lane. A function for supporting the braking operation of the driver includes a collision damage reducing brake system. The collision damage reducing brake system is a system for detecting an obstacle or the like ahead of the vehicle using the camera device 340, the radar device 330, or the like and warning the driver and, when collision is unavoidable, performing auxiliary operation for a brake.

The embodiment explained above is a preferred implementation mode of the present invention. However, the present invention is not limited to the embodiment and various modified implementations are possible within a range not departing from the spirit of the present invention. For example, FIG. 2 is a schematic diagram in which the functional configuration of the automatic driving support system 1 is classified according to main processing contents and shown to facilitate understanding of the present invention. FIG. 3 is a schematic diagram in which the functional configuration of the control section 170 is classified according to main processing contents and shown. However, the configurations of the automatic driving support system 1 and the control section 170 can also be classified into a larger number of components according to processing contents. One component can be configured to execute a larger number of kinds of processing. Processing of the components may be executed by one kind of hardware or may be executed by a plurality of kinds of hardware. The processing of the components may be realized by one program or may be realized by a plurality of programs.

REFERENCE SIGNS LIST 1 driving support system
161 recommended-lane selecting section
165 position specifying section
200 vehicle control ECU (vehicle control device)
500 automatic driving support device (lane selecting device)
540 storing section

The invention claimed is:

1. A lane selecting device comprising:
   a GPS receiver receiving information indicating a position coordinate and an advancing direction of a vehicle;
   a memory storing a map database including lane information, which is information concerning lanes of a road;
   a control section; and
   a transceiver connecting between the control section and an engine control unit of the vehicle to transmit data generated by the control section and receive data transmitted from the engine control unit,
   wherein the control section includes
   a CPU,
   a position specifying section controlled by the CPU to specify a present position of a vehicle based on the information received by the GPS receiver, and
   a recommended-lane selecting section controlled by the CPU to calculate, on the basis of the present position specified by the position specifying section and the lane information included in the map database, for each of lanes of a road on which the vehicle is traveling, a recommendation degree indicating a degree of recommending traveling and to select, on the basis of the calculated recommendation degree, a lane in which the vehicle is to travel, wherein when a branching point is present ahead of the vehicle, the recommended-lane selecting section specifies a lane in which the vehicle is recommended to travel in entering the branching point, uses a number of changes from a lane in which the vehicle is currently traveling to the specified lane as the lane information and calculates the recommendation degree of each of the lanes making the degree of recommendation inversely proportional to a number of lane changes from a lane in which the vehicle is currently traveling to the specified lane, wherein the recommended-lane selecting section sets a predetermined section immediately before the branching point as a lane unchangeable section in which the lane change cannot be performed and calculates the recommendation degree to be inversely proportional to a remaining distance from a present position to entrance in the lane unchangeable section.

2. The lane selecting device according to claim 1, wherein the recommended-lane selecting section changes length of the lane unchangeable section according to presence or absence of occurrence of a traffic jam.

3. A lane selecting method comprising:

a step of specifying a present position of a vehicle by a position specifying section controlled by a CPU based on information indicating a position coordinate and an advancing direction of the vehicle received by a GPS receiver;

a step of calculating, on the basis of the specified present position and lane information, which is information concerning lanes of a road included in a map database stored in a memory, for each of lanes of a road on which the vehicle is traveling, a recommendation degree indicating a degree of recommending traveling by a recommended-lane selecting section controlled by the CPU; and a step of transmitting the recommendation degree generated from the recommended-lane selecting section to an engine control unit through a transceiver, wherein, in the step of calculating the recommendation degree, when a branching point is present ahead of the vehicle, a lane in which the vehicle is recommended to travel in entering the branching point is specified, a number of changes from a lane in which the vehicle is currently traveling to the specified lane is used as the lane information and the recommendation degree of each of the lanes is calculated inversely proportional to a number of lane changes from a lane in which the vehicle is currently traveling to the specified lane, wherein, in the step of calculating the recommendation degree, a predetermined section immediately before the branching point is set as a lane unchangeable section in which the lane change cannot be performed and the recommendation degree is calculated inversely proportional to a remaining distance from a present position to entrance in the lane unchangeable section.

4. The lane selecting method according to claim 3, wherein, in the step of calculating the recommendation degree, length of the lane unchangeable section is changed according to presence or absence of occurrence of a traffic jam.

* * * * *